(12) United States Patent
Huang et al.

(10) Patent No.: US 6,466,933 B1
(45) Date of Patent: Oct. 15, 2002

(54) DELAYED DELIVERY OF QUERY RESULTS OR OTHER DATA FROM A FEDERATED SERVER TO A FEDERATED CLIENT UNTIL SUCH INFORMATION IS NEEDED

(75) Inventors: Mei-Ing W. Huang, San Jose, CA (US); Taejae Lee, Cupertino, CA (US); Basuki N. Soetarman, Los Gatos, CA (US); Robert Nelson Summers, San Jose, CA (US); Mimi Phuong-Thao Vo, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/399,697

(22) Filed: Sep. 21, 1999

(51) Int. Cl.[7] .................. G06F 17/30; G06F 7/00
(52) U.S. Cl. ............... 707/3; 707/1; 707/4; 707/5; 707/10; 707/100
(58) Field of Search .............. 707/3, 10, 1, 4, 707/5

(56) References Cited

U.S. PATENT DOCUMENTS

| | | | |
|---|---|---|---|
| 4,525,803 A | 7/1985 | Vidalin et al. ............ 364/900 |
| 4,646,061 A | 2/1987 | Bledsoe ................... 340/347 |
| 5,202,981 A | 4/1993 | Shackelford ............. 395/600 |
| 5,303,342 A | 4/1994 | Edge ....................... 395/164 |
| 5,317,736 A | 5/1994 | Bowen ..................... 395/600 |
| 5,355,493 A | 10/1994 | Silberbauer et al. ...... 395/700 |
| 5,708,828 A | 1/1998 | Coleman .................. 395/785 |
| 5,742,806 A | 4/1998 | Reiner et al. ............ 395/600 |
| 5,745,906 A | 4/1998 | Squibb .................... 707/203 |
| 5,752,252 A | 5/1998 | Zbikowski et al. ....... 707/205 |
| 5,774,888 A | 6/1998 | Light ......................... 707/5 |
| 5,864,866 A | 1/1999 | Henckel et al. ........... 707/103 |
| 5,884,303 A | 3/1999 | Brown ........................ 707/3 |
| 5,893,119 A | 4/1999 | Squibb .................... 707/203 |
| 5,903,894 A | 5/1999 | Reneris .................... 707/100 |
| 6,006,217 A | * 12/1999 | Lumsden ..................... 707/2 |

FOREIGN PATENT DOCUMENTS

| | | |
|---|---|---|
| EP | 169389 A | 1/1986 |
| EP | 228213 A | 7/1987 |
| EP | 532004 A | 3/1993 |
| EP | 632364 A | 1/1995 |
| EP | 632366 A | 1/1995 |
| EP | 678986 A | 10/1995 |
| EP | 711083 A | 5/1996 |
| EP | 712257 A | 5/1996 |
| EP | 755161 A | 1/1997 |
| EP | 757333 A | 2/1997 |
| EP | 0838 771 A | 4/1998 |
| EP | 0 838 771 A2 | 4/1998 |
| JP | 11122116 A | 4/1998 |
| JP | 11075160 A | 3/1999 |
| WO | WO 8802888 A | 4/1988 |
| WO | WO 9617306 A | 11/1995 |
| WO | WO 98 35480 A | 8/1998 |

OTHER PUBLICATIONS

"DB2 Universal Database Server for OS/390, version 6, DB2 Universal database Extenders", International Business Machines Corporation, pp. 1–8, May 1998.

(List continued on next page.)

*Primary Examiner*—Kim Vu
*Assistant Examiner*—Hung Q Pham
(74) *Attorney, Agent, or Firm*—Sughrue Mion, PLLC

(57) ABSTRACT

A technique for delayed delivery of query results or other data from a federated server to a federated client until such information is needed. One or more commands are executed at a client computer to retrieve data from one or more datastores connected to a server computer. At the client computer, a search request is transmitted to the server computer. Then, a client collection is generated for use in retrieving physical data from the server computer. When data is requested using the client collection, physical data is retrieved from the server computer.

18 Claims, 11 Drawing Sheets-

OTHER PUBLICATIONS

"Information Intergration with IBM DB2 DataJoinder Version 2", White Paper, Data Management Solutions, International Business Corporation, First Edition Sep. 1997.

"Informix Datablade Technology", http://www.informix.com/informix/products/options/udo/datablade/dbtech/overview.

"Informix Datablade Technology—To get to the top and stay there, your business must work smarter; you must think ahead and continuously adapt to new market conditions and take advantage of new opportunities as they arise", http://www.informix.com/informix/products/options/udo/datablade/dbtech/ov . . . /db intro.ht.

"Informix Datablade Technology—Informix Dynamic Server—Universal Data Option fast, Intergrated–and Extensible", http://www.informix.com/informix/products/options/udo/datablade/dbtech/overview/body.htm.

"Informix Datablade Technology—Transforming Data into Smart Data", http://www.informix.com/informix/products/integration/datablade/datablade ds.htm.

"Jini—Technology Executive Overview", Sun Microsystems, Inc. Jan. 1999 http://ww.sun.com/jini/overview/overview.pdf.

Oracle8i Data Cartridge Developer's Guide Release 8.1.5 A68002–01, Oracle Corporation, 1999.

"Jini—Connection Technology", Sun Microsystems, Inc. 1999 http://www.sun.com/jini.

Shatz, B. et al., "Federating diverse collections of scientific literature", Computer, vol. 29, No. 5 pp. 28–36, May 1996 (abstract).

* cited by examiner

DELAYED DELIVERY OF QUERY RESULTS OR OTHER DATA FROM A FEDERATED SERVER TO A FEDERATED CLIENT UNTIL SUCH INFORMATION IS NEEDED

CROSS-REFERENCE TO RELATED APPLICATIONS

This application is related to the following co-pending and commonly-assigned patent applications:

application Ser. No. 09/400,532, entitled "MANAGING RESULTS OF FEDERATED SEARCHES ACROSS HETEROGENEOUS DATASTORES WITH A FEDERATED RESULT SET CURSOR OBJECT," filed on same date herewith, by Basuki N. Soertannan et al.;

application Ser. No. 09/399,696, entitled "THE ARCHITECTURE AND IMPLEMENTATION OF A DYNAMIC RMI SERVER CONFIGURATION HIERARCHY TO SUPPORT FEDERATED SEARCH AND UPDATE ACROSS HETEROGENEOUS DATASTORES," filed on same date herewith, by Kehsing J. Chou et al.;

application Ser. No. 09/400,638, entitled "THE DESIGN AND IMPLEMENTATION OF A CLIENT/SERVER FRAMEWORK FOR FEDERATED MULTI-SEARCH AND UPDATE ACROSS HETEROGENEOUS DATASTORES," filed on same date herewith, by Kehsing J. Chou et al.;

application Ser. No. 09/399,682, entitled "ARCHITECTURE TO ENABLE SEARCH GATEWAYS AS PART OF FEDERATED SEARCH," filed on same date herewith, by Kehsing J. Chou et al.;

application Ser. No. 09/399,695, entitled "IMPROVED EXTENDED DATA OBJECT ARCHITECTURE FOR HANDLING MULTI-STREAMING AND COMPLEX MULTI-DIMENSIONAL FILES," filed on same date herewith, by Kehsing J. Chou et al.;

application Ser. No. 08/852,062, entitled "CLASS HIERARCHY FOR OBJECT AGGREGATION REPRESENTATION OF RELATIONAL DATABASE ROWS WITH CELLS HAVING NONTRADITIONAL DATATYPES," filed on May 6, 1997, by Daniel T. Chang et al.;

application Ser. No. 08/852,055, entitled "FLEXIBLE OBJECT REPRESENTATION OF RELATIONAL DATABASE CELLS HAVING NONTRADITIONAL DATATYPES," filed on May 6, 1997, by Daniel T. Chang et al.;

application Ser. No. 09/052,678, entitled "MANAGING RESULTS OF FEDERATED SEARCHES ACROSS HETEROGENEOUS DATASTORES WITH A FEDERATED COLLECTION OBJECT," filed on Apr. 1, 1998, by Daniel T. Chang et al.;

application Ser. No. 09/052,680, entitled "FEDERATED SEARCHING OF HETEROGENEOUS DATASTORES USING A FEDERATED DATASTORE OBJECT," filed on Apr. 1, 1998, by Daniel T. Chang et al.; and application Ser. No. 09/052,679, entitled "FEDERATED SEARCHING OF HETEROGENEOUS DATASTORES USING A FEDERATED QUERY OBJECT," filed on Apr. 1, 1998, by Daniel T. Chang et al.;

each of which is incorporated by reference herein.

BACKGROUND OF THE INVENTION

1. Field of the Invention

This invention relates in general to database management systems performed by computers, and in particular, to delayed delivery of query results or other data from a federated server to a federated client until such information is needed.

2. Description of Related Art

The present invention relates to a system and method for representing and searching multiple heterogeneous datastores and managing the results of such searches. Datastore is a term used to refer to a generic data storage facility, such as a relational data base, flat-file, hierarchical data base, etc. Heterogeneous is a term used to indicate that the datastores need not be similar to each other. For example, each datastore may store different types of data, such as image or text, or each datastore may be based on a different theory of data model, such as Digital Library/VisualInfo or Domino Extended Search (DES).

For nearly half a century computers have been used by businesses to manage information such as numbers and text, mainly in the form of coded data. However, business data represents only a small part of the world's information. As storage, communication and information processing technologies advance, and as their costs come down, it becomes more feasible to digitize other various types of data, store large volumes of it, and be able to distribute it on demand to users at their place of business or home.

New digitization technologies have emerged in the last decade to digitize images, audio, and video, giving birth to a new type of digital multimedia information. These multimedia objects are quite different from the business data that computers managed in the past, and often require more advanced information management system infrastructures with new capabilities. Such systems are often called "digital libraries."

Bringing new digital technologies can do much more than just replace physical objects with their electronic representation. It enables instant access to information; supports fast, accurate, and powerful search mechanisms; provides, new "experiential" (i.e. virtual reality) user interfaces; and implements new ways of protecting the rights of information owners. These properties make digital library solutions even more attractive and acceptable not only to corporate IS organizations, but to the information owners, publishers and service providers.

Generally, business data is created by a business process (an airline ticket reservation, a deposit at the bank, and a claim processing at an insurance company are examples). Most of these processes have been automated by computers and produce business data in digital form (text and numbers). Therefore it is usually structured coded data. Multimedia data, on the contrary, cannot be fully pre-structured (its use is not fully predictable) because it is the result of the creation of a human being or the digitization of an object of the real world (x-rays, geophysical mapping, etc.) rather than a computer algorithm.

The average size of business data in digital form is relatively small. A banking record—including a customers name, address, phone number, account number, balance, etc.—represents at most a few hundred characters, i.e. few hundreds/thousands of bits. The digitization of multimedia information (image, audio, video) produces a large set of bits called an "object" or "blobs" (Binary Large Objects). For example, a digitized image of the parchments from the Vatican Library takes as much as the equivalent of 30 million characters (30 MB) to be stored. The digitization of a movie, even after compression, may take as much as the equivalent of several billions of characters (3–4 GB) to be stored.

Multimedia information is typically stored as much larger objects, ever increasing in quantity and therefore requiring special storage mechanisms. Classical business computer systems have not been designed to directly store such large objects. Specialized storage technologies may be required for certain types of information, e.g. media streamers for video or music. Because certain multimedia information needs to be preserved "forever" it also requires special storage management functions providing automated back-up and migration to new storage technologies as they become available and as old technologies become obsolete.

Finally, for performance reasons, the multimedia data is often placed in the proximity of the users with the system supporting multiple distributed object servers. This often requires a logical separation between applications, indices, and data to ensure independence from any changes in the location of the data.

The indexing of business data is often imbedded into the data itself. When the automated business process stores a person's name in the column "NAME," it actually indexes that information. Multimedia information objects usually do not contain indexing information. This "meta data" needs to be created in addition by developers or librarians. The indexing information for multimedia information is often kept in "business like" databases separated from the physical object.

In a Digital Library (DL), the multimedia object can be linked with the associated indexing information, since both are available in digital form. Integration of this legacy catalog information with the digitized object is crucial and is one of the great advantages of DL technology. Different types of objects can be categorized differently as appropriate for each object type. Existing standards like MARC records for libraries, Finding Aids for archiving of special collections, etc . . . can be used when appropriate.

The indexing information used for catalog searches in physical libraries is mostly what one can read on the covers of the books: authors name, title, publisher, ISBN, . . . enriched by other information created by librarians based on the content of the books (abstracts, subjects, keywords, . . . ). In digital libraries, the entire content of books, images, music, films, etc . . . are available and "new content" technologies are needed; technologies for full text searching, image content searching (searching based on color, texture, shape, etc . . . ), video content searching, and audio content searching. The integrated combination of catalog searches (e.g. SQL) with content searches will provide more powerful search and access functions. These technologies can also be used to partially automate further indexing, classification, and abstracting of objects based on content.

To harness the massive amounts of information spread throughout these networks, it has become necessary for a user to search numerous storage facilities at the same time without having to consider the particular implementation of each storage facility.

Object-oriented approaches are generally better suited for such complex data management. The term "object-oriented" refers to a software design method which uses "classes" and "objects" to model abstract or real objects. An "object" is the main building block of object-oriented programming, and is a programming unit which has both data and functionality (i.e., "methods"). A "class" defines the implementation of a particular kind of object, the variables and methods it uses, and the parent class it belongs to.

Some known programming tools that can be used for developing search and result management frameworks include IBM VisualAge C++, Microsoft Visual C++, Microsoft Visual J++, and Java.

There is a need in the art for an improved federated system. In particular, there is a need in the art for delayed delivery of query results or other data from a federated server to a federated client until such information is needed.

SUMMARY OF THE INVENTION

To overcome the limitations in the prior art described above, and to overcome other limitations that will become apparent upon reading and understanding the present specification, the present invention discloses a technique for delayed delivery of query results or other data from the federated server to federated client until such information is needed.

According to an embodiment of the invention, one or more commands are executed at a client computer to retrieve data from one or more datastores connected to a server computer. At the client computer, a search request is transmitted to the server computer. Then, a client collection generated for use in retrieving physical data from the server computer. When data is requested using the client collection, physical data is retrieved from the server computer.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Federated Architecture

Figure 1:
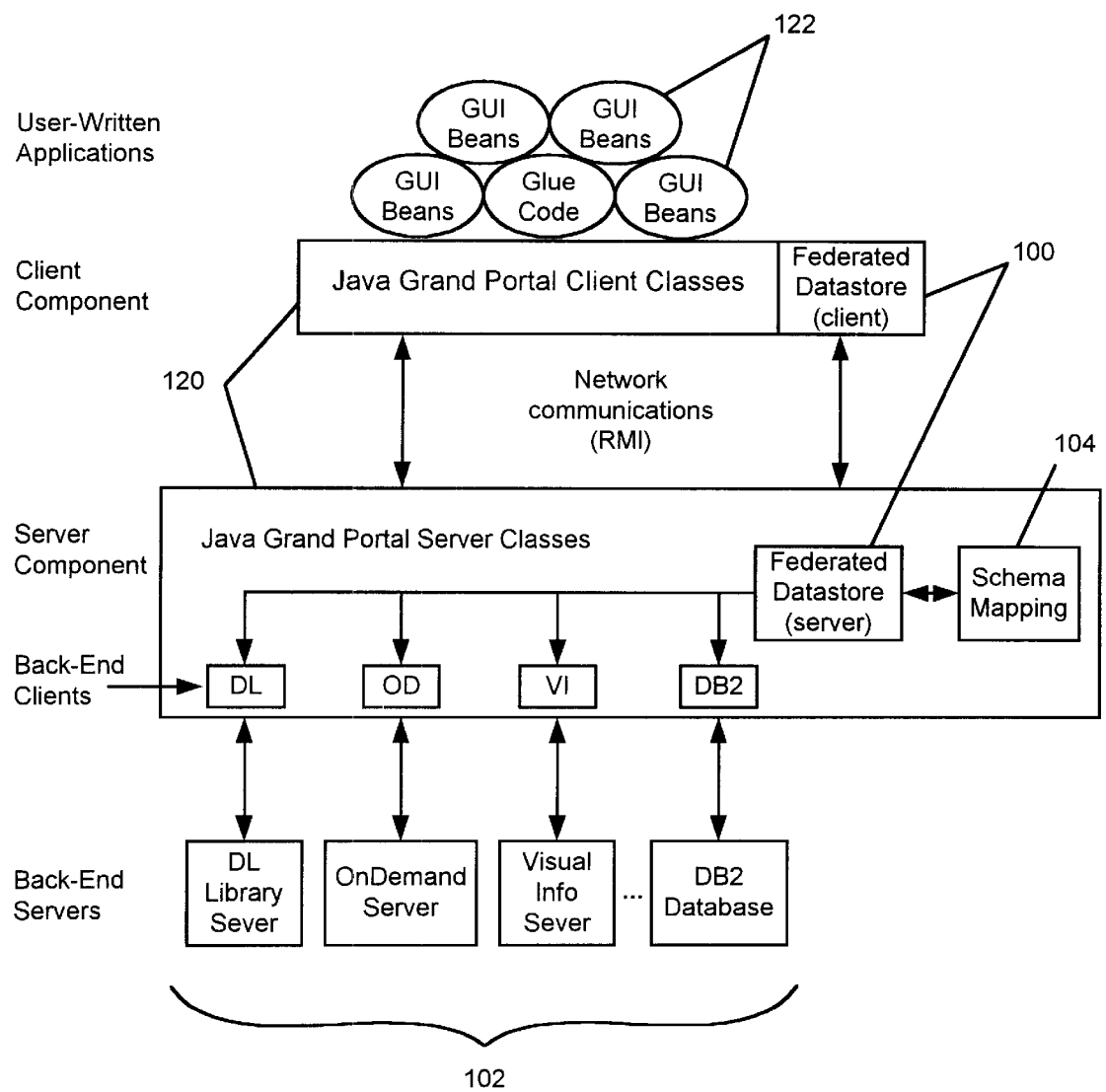
FIG. 1 is a diagram illustrating a computer architecture that could be used in accordance with the present invention.

FIG. 1 is a diagram illustrating a computer architecture that could be used in accordance with the present invention.

The present invention is described herein by way of example and is not intended to be limited to the described embodiment. The description of the preferred embodiment is based on, but certainly not limited to, the IBM design of Java Grand Portal Class Library, the Digital Library Java Application Programming Interface (API).

The Java Grand Portal 120 is comprised of client and server classes. In particular, Java Grand Portal is a set of Java classes which provides access and manipulation of local or remote data stored in Digital Library storage facilities. It uses Java APIs based on OMG-Object Query Services (OQS) and a Dynamic Data Object protocol, which is a part of OMG/Persistence Object Services.

The Java APIs provide multi-search capabilities such as:
1. Searching within a given datastore using one or a combination of supported query types, i.e., Parametric query—Queries requiring an exact match on the condition specified in the query predicate and the data values stored in the datastore.

Text query—Queries on the content of text fields for approximate match with the given text search expression, e.g. the existence (or non-existence) of certain phrases or word-stems.

Image query—Queries on the content of image fields for approximate match with the given image search expression, e.g. image with certain degree of similarity based on color percentages, layout, or texture.

2. Each search type is supported by one or more search-engines.
3. Searching on the results of a previous search.
4. Searching involving heterogeneous datastores.

The Digital Library Grand Portal classes provide a convenient API for Java application users; the applications can be located at local or remote sites. Java classes will typically reside on both server and client sides; both sides providing the same interface. The client side of Java classes communicates with the server side to access data in the Digital Library through the network. Communication between client and server sides is done by these classes; it is not necessary to add any additional programs.

In particular, FIG. 1 is an architectural diagram outlining the structure of the federated search for Digital Library repositories using the federated datastore 100, comprised of a federated datastore client and server. A federated datastore 100 is a virtual datastore which combines several heterogeneous datastores 102 into a consistent and unified conceptual view. This view, or a federated schema, is established via schema mapping 104 of the underlying datastores. The users interact with a federated datastore 100 using the federated schema, without needing to know about the individual datastores 102 which participate in the federated datastore 100.

One embodiment of the invention provides a data delivery system that provides delayed delivery of query results or other data from a federated server to a federated client until such information is needed. In one embodiment of the invention, one or more programs or functions implement the data delivery system. In one embodiment, these programs and functions reside at the federated datastore.

The federated datastore 100 does not have a corresponding back-end client. Since it is a virtual datastore, the federated datastore 100 relies on the underlying physical back-end client associated with it, such as the DL client (i.e., Digital Library client), OnDemand, VisualInfo, DB2, etc. Digital Library, OnDemand, VisualInfo, and DB2 are all products from International Busniness Machines Corporation. As mentioned before, this association is established by a schema mapping component 104.

The communication between the federated datastore 100 client and server can be done by any appropriate protocol. On top of Java Grand Portal client classes, the users can develop application programs using, for example, any existing Java Beans 122 development environment.

The federated datastore 100 coordinates query evaluation, data-access, and transaction processing of the participating heterogeneous datastores 102. Given the federated schema, a multi-search query can be formulated, executed, and coordinated to produce results in the form of a datastore-neutral dynamic data object.

Note that each heterogeneous datastore and the federated datastore are created using one datastore definition or super-class. The federated datastore 100 and the heterogeneous datastores 102 are all subclasses of a class called Datastore, therefore, all of these datastores 100 and 102 have the same interface. Therefore, a user would be able to access the federated datastore 100 and the heterogeneous datastores 102 in a consistent and uniform manner.

Additionally, the objects stored in the federated datastore 100 and the heterogeneous datastores 102 are subclasses of a Data Object class. The Data Object class includes subclasses for dynamic data objects (DDOs) and extended data objects (XDOs). A DDO has attributes, with type, value, and properties. The value of an attribute can be a reference to another DDO or XDO, or a collection of DDOs or XDOs.

Figure 2:
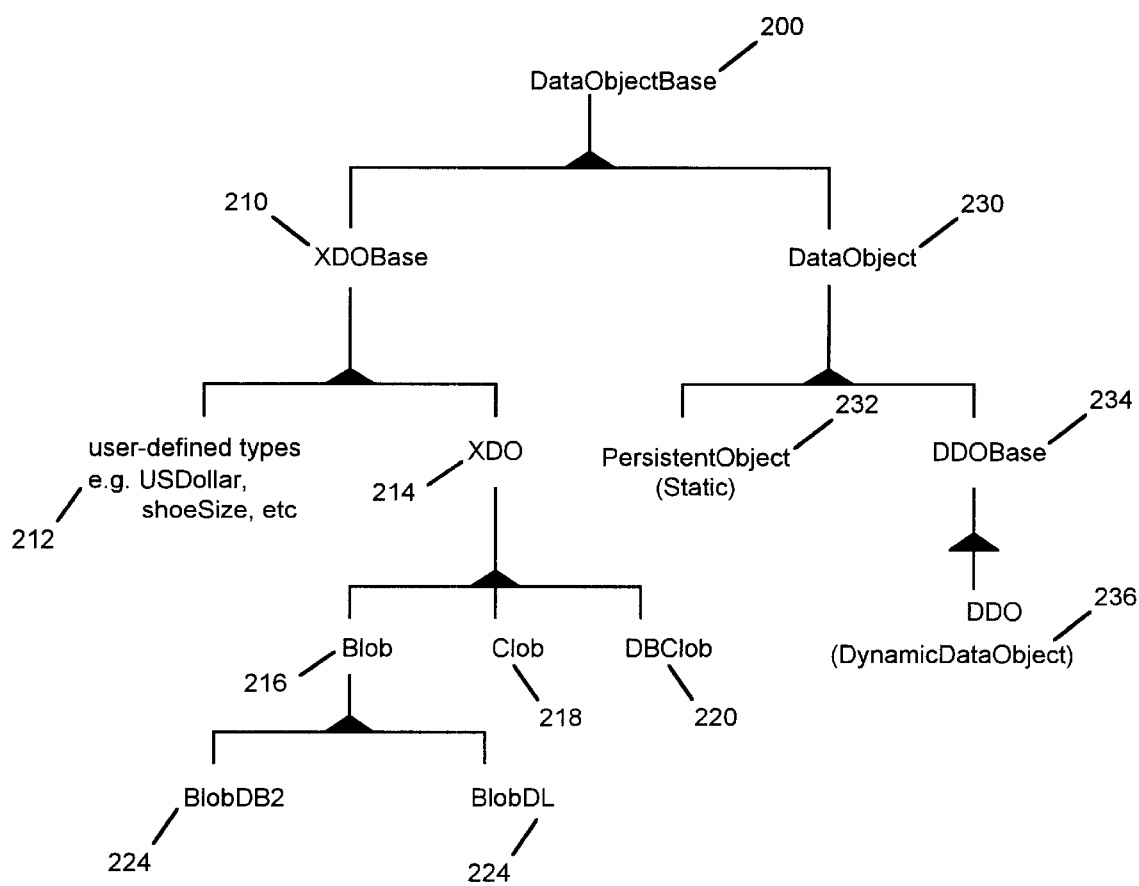
FIG. 2 is a diagram illustrating a class hierarchy for Data Object classes.

FIG. 2 is a diagram illustrating a class hierarchy for Data Object classes. The objects stored in and manipulated by the datastores and fetch operations belong to data object classes. These objects are returned as the result of a fetch, or created and used in CRUD (add, retrieve, update, delete) operations.

A DataObjectBase 200 is an abstract base class for all data objects known by datastores. It has a protocol attribute, that indicates to the datastore which interface can be used to operate on this object. A XDOBase 210 is the base class used to represent user-defined-types (UDT) or large objects. In particular, the XDOBase 210 is the base class for some user-defined types 212 and XDOs 214. A XDO 214 represents complex UDTs or large objects (LOB). This object can exist stand-alone or as a part of a DDO 236. Therefore, it has a persistent object identifier and CRUD operations capabilities.

Blob 216 is a base class for BLOBs as a placeholder to share all generic operations pertaining to BLOBs. Clob 218 is a base class for CLOBs (Character Large Objects) as a placeholder to share all generic operations pertaining to CLOBs. DBClob 220 is a base class for DBCLOBs (database character large object) as a placeholder to share all generic operations pertaining to DBCLOBs. BlobDB2 222 represents a BLOB specific to DB2, and BlobDL 22 represents a BLOB specific to DL. Similarly, though not shown, there may be subclasses for ClobDB2, ClobDL, etc.

A DataObject 230 is a base class for PersistentObject 232 and DDOBase 234. A PersistentObject 232 represents a specific object whose code is statically generated and compiled. This type of object will not be covered in this document. A DDOBase 234 is a base class for a dynamic data object 236 (without the CRUD methods). A DDO (Dynamic Data Object) 236 represents generic data objects which are constructed dynamically at runtime. This object fits well with query and browsing activities in Grand Portal where objects are only known and generated at runtime. It supports the CRUD operations (add, retrieve, update, and delete), and, with the help of its associated datastore, a DDO can put itself into and out of the datastore.

One skilled in the art would recognize that these are only example classes and subclasses and other structures maybe used for objects and other classes or subclasses may be added to or removed from the tree shown in FIG. 2.

With respect to the notion of "federation", each participating datastore preserves the right to maintain its "personality", i.e. its own query language, data-model or schema, method of interaction, etc, and at the same time cooperating in a federation to provide a federated schema. This design allows the users to preserve the natural view to their favorite datastore as well as access them in conjunction with other datastores in a federated context.

The federated datastore 100 can combine the participating native datastores in two ways:

With Mapping

As described above, mapping of concepts across participating datastores is established to provide a unified conceptual view. Based on this federated schema, federated queries with both join and union expressions can be formulated.

Without Mapping

In this case, the federated datastore 100 only reflects the union of each participating datastore's conceptual view. Although it coordinates query processing and data-access for each underlying datastore, the federated datastore 100 must accept queries in each datastore's native language since the query translation process can not be performed without mapping. In addition, since there is no conceptual mapping between datastores, the FederatedQuery 19 results can only reflect the union of results from each datastore.

The embodiment of the invention is incorporated into one or more software programs that reside at the federated datastore 100. Generally, the software programs and the instructions derived therefrom, are all tangibly embodied in a computer-readable medium, e.g. one or more of the data storage devices, which may be connected to the federated datastore 100. Moreover, the software programs and the instructions derived therefrom, are all comprised of instructions which, when read and executed by the computer system 100, causes the computer system 100 to perform the steps necessary to implement and/or use the present invention. Under control of an operating system, the software programs and the instructions derived therefrom, may be loaded from the data storage devices into a memory of the federated datatstore 100 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Federated Datastore

Figure 3:
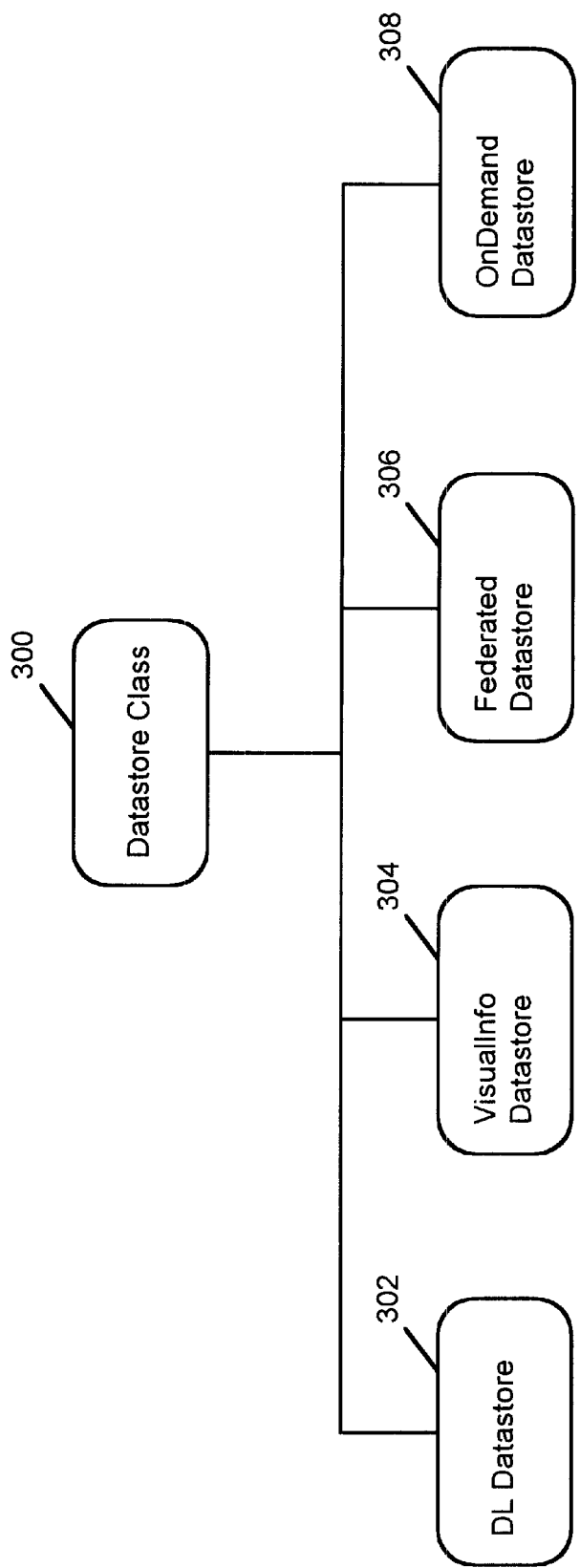
FIG. 3 is a diagram illustrating a class hierarchy for Datastore classes.

FIG. 3 is a diagram illustrating a class hierarchy for Datastore classes. A main datastore class 300 is an abstract base class (i.e., superclass) for all datastores. In particular, some datastore classes that are based on the datastore class 300 and inherit its characteristics are the following: a DL Datastore class 302, a VisualInfo Datastore class 304, a Federated Datastore class 306, and an OnDemand Datastore class 308. It is to be understood that the techniques of the invention may be applied to any data source and is not limited to the mentioned datastores.

Figure 4:
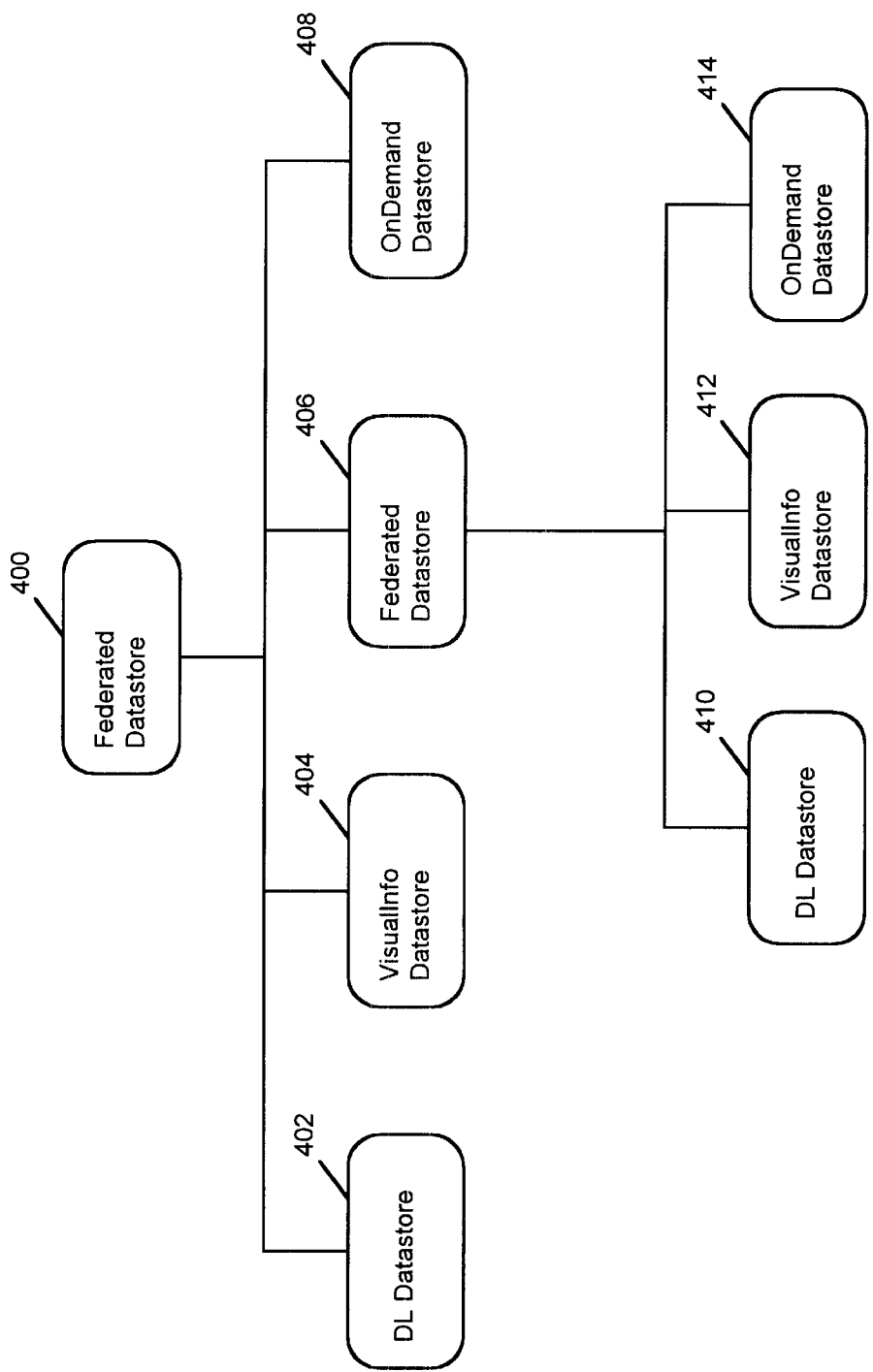
FIG. 4 is a diagram illustrating a conceptual view of a federated result set cursor object.

FIG. 4 is a diagram illustrating one composition of a federated datastore. The federated datastore 400 connects to heterogeneous datastores 402, 404, 406, and 408. As illustrated, a federated datastore 406 may connect to and be nested under federated datastore 400. Additionally, the federated datastore 406 may connect to heterogeneous datastores 410, 412, and 414. The depicted architecture is only a sample, and one skilled in the art would recognize that other examples fall within the scope of the invention.

In the preferred embodiment, the federated datastore 100 takes query strings expressed in a federated query language. An example class definition for DatastoreFederated 100 is set forth below.

DKDatastoreFed.java

```
package com.ibm.mm.sdk.server;
public class DKDatastoreFed extends dkAbstractDataS-
    tore
    implements
        DKConstantFed,
        DKConstant,
        DKMessageIdFed,
        DKMessageId,
        dkFederation,
        java.io.Serializable
{
public dkCollection listEntities() throws DKException,
    Exception
public String[] listEntityNames() throws DKException,
    Exception
public String[] listTextEntityNames() throws
    DKException, Exception
public String[] listParmEntityNames() throws
    DKException, Exception
public dkCollection listEntityAttrs(String entityName)
    throws DKException, Exception
public String[] listEntityAttrNames(String entityName)
    throws DKException, Exception
public String registerMapping(DKNVPair sourceMap)
    throws DKException, Exception
public void unRegisterMapping(String mappingName)
    throws DKException, Exception
public String[] listNappingNames() throws DKException,
    Exception
public dkSchemaMapping getMapping(String
    mappingName) throws DKException,
    Exception
public synchronized dkExtension getExtension(String
    extensionName) throws
    DKException, Exception
public synchronized void addExtension(String
    extensionName,
    dkExtension extensionObj) throws DKException,
    Exception
public synchronized void removeExtension(String
    extensionName) throws
    DKException, Exception
public synchronized String[] listExtensionNames()
    throws DKException, Exception
``` public DKDDO createDDO(String objectType,
    int Flags) throws DKException, Exception
public dkCollection listSearchTemplates() throws
    DKException, Exception
public String[] listSearchTemplateNames() throws
    DKException, Exception
public dkSearchTemplate getSearchTemplate(String
    templateName) throws
    DKException, Exception
public void destroy() throws DKException, Exception
public synchronized string addRemoveCursor
    (dkResultSetCursor iCurt int action)
    throws DKException, Exception
public dkDatastore datastoreByServerName (String
    dsType, String dsName)
    throws DKException, Exception
public void changePassword (String serverName,
    String user Id,
    String oldPwd,
    String newPwd)
    throws DKException, Exception
public void requestConnection (String serverName,
    String userId,
    String passwd,
    String connectString)
    throws DKException, Exception
public void excludeServer (Sting serverName, String
    templateName)
    throws DKException, Exception
public boolean isServerExcluded (String serverName,
    String templateName)
    throws DKException, Exception, java.rmi.RemoteException
public String[] listExcludedServers(String
    templateName) throws DKException,
    Exception
public void clearExcludedServers(String templateName)
    throws DKException,
    Exception
};
The following methods are part of the federated datastore
class:
public DKDatastoreFed() throws DKException, Exception
    Constructs default Federated Datastore.
public DKDatastoreFed(String configuration) throws
DKException, Exception
Constructs default Federated Datastore.
public void connect(String datastore_name,
    String user_name,
    String authentication,
    String connect_string) throws DKException, Exception
    Establishes a connection to a federated datastore.
    Parameters:
        datastore_name—federated datastore name
        user_name—userId to logon to this federated datastore
        authentication—password for this user_name
        connect string—additional information string
    Throws: DKException
        if either:
        datastore_name, user_name, or authentication is null
        or if error occurs in the federated datastore Overrides:
    connect in class dkAbstractDatastore
public void disconnect() throws DKException, Exception
    Disconnects from the federated datastore.
    Throws: DKException
        if unable to disconnect from server.
    Overrides:
        disconnect in class dkAbstractDatastore
public Object getOption(int option) throws DKException
    Gets defined datastore option
    Parameters:
        option—an option id
    Returns:
        the value for the given option
    Throws: DKException
        if option is not set
    Overrides:
        getOption in class dkAbstractDatastore
public void setOption(int option, Object value) throws
DKException
    Sets the given "option" with a specific "value".
    Parameters:
        option—an option id
        value—the value for the "option"
    Throws: DKException
        if option/value is invalid
    Overrides:
        setOption in class dkAbstractDatastore
public Object evaluate(String command,
    short commandLangType,
    DKNVPair params[]) throws DKException, Exception
    Evaluates a query and returns the result as a dkQueryableCollection object.
    Parameters:
        command—a query stirng that represent the query
            criteria
        commandLangType—a query language type, for
            Federated, it will be
            DK_FEDERATED_QL_TYPE
        params—a name/value pairs list
    Returns:
        a query result collection
    Throws: DKException
        if "command" argument is null
    Overrides:
        evaluate in class dkAbstractDatastore
public Object evaluate(dkQuery query) throws
DKException, Exception
    Evaluates a query and returns the result as a dkQueryableCollection.
    Parameters:
        query—a given query object
    Returns:
        a query result collection
    Throws: DKException
        if the "query" input is null or not of federated query
            type.
    Overrides:
        evaluate in class dkAbstractDatastore public Object evaluate(DKCQExpr qe) throws DKException, Exception
   Evaluates a query.
   Parameters:
      qe—a common query expression object
   Returns:
      a collection of the results
   Throws: DKException
      if common query expression object is invalid
   Overrides:
      evaluate in class dkAbstractDatastore
public dkResultSetCursor execute(String command,
      short commandLangType,
      DKNVPair params[]) throws DKException, Exception
   Executes a command query of the federated datastore and returns a result set cursor.
   Parameters:
      command—a query string that represents the query criteria.
      commandLangType—a query language type, for Federated, it will be
         DK_FEDERATED_QL_TYPE.
      params[]—a name/value pairs list.
   Returns:
      a dkResultSetCursor object.
   Throws: DKException
      if "command" is null or invalid, or "commandLangType" is not Federated
      Query type.
   Overrides:
      execute in class dkAbstractDatastore
public dkResultSetCursor execute(dkQuery query) throws DKException, Exception
   Executes a command query of the federated datastore and returns a result set cursor. This method takes a Federated query object as an argument.
   Parameters:
      query—a federated dkQuery object
   Returns:
      a dkResultSetCursor object
   Throws: DKException
      if "query" object is null or query.qlType() is not DK_FEDERATED_QL_TYPE
   Overrides:
      execute in class dkAbstractDatastore
35 public dkResultSetCursor execute(DKCQExpr cqe) throws DKException, Exception
   Executes a query expression.
   Parameters:
      cqe—a common query expression object
   Returns:
      resultSetCursor which represents a federated datastore cursor.
   Throws: DKException
      if "cqe" object is invalid
   Overrides:
      execute in class dkAbstractDatastore
public void executeWithCallback(dkQuery query,
      dkCallback callbackObj) throws DKException, Exception
   Executes a query with callback function.
   Parameters:
      query—a query object
      callbackObj—a dkCallback object
   Overrides:
      executeWithCallback in class dkAbstractDatastore
public void executeWithCallback(String command,
      short commandLangType,
      DKNVPairparams[],
      dkCallback callbackObj) throws DKException, Exception
   Execute the query with callback function.
   Parameters:
      command—a query string
      commandLang—a query type
      params—additional query option in name/value pair
      callbackObj—a dkCallback object
   Overrides:
      executeWithCallback in class dkAbstractDatastore
public void executeWithCallback(DKCQExpr cqe,
      dkCallback callbackObj) throws DKException, Exception
   Execute a query expression with callback function.
   Parameters:
      cqe—a common query expression object
      callbackObj—a dkCallback object
   Overrides:
      executeWithCallback in class dkAbstractDatastore
public dkQuery createQuery(String command,
      short commandLangType,
      DKNVPair params[]) throws DKException
   Creates a federated query object.
   Parameters:
      command—a query string that represents the query criteria
      commandLangType—a query language type, it will be one of the following:
         DK_CM_TEMPLATE_QL_TYPE
         DK_CM_TEXT_QL_TYPE
         DK_CM_IMAGE QL_TYPE
         DK_CM_PARAMETRIC_QL_TYPE
         DK_CM_COMBINEDQL_TYPE
      params[]—a name/value pairs list
   Returns:
      a federated dkQuery object
   Throws: DKException
      if "command" is null
   Overrides:
      createQuery in class dkAbstractDatastore
public dkQuery createQuery(DKCQExpr qe) throws DKException
   Creates a query object.
   Parameters:
      cqe—a common query expression object
   Throws: DKException
      if "cqe" object is invalid
   Overrides:
      createQuery in class dkAbstractDatastore
public dkCollection listDataSources() throws DKException
   List the available datastore sources that a user can connect to.
   Returns:
      a collection of ServerDef objects describing the servers
   Throws: DKException
      if internal error occurs from server Overrides:
  listDataSources in class dkAbstractDatastore
public String[] listDataSourceNames() throws DKException
  Gets a list of datasource names.
  Returns:
    an array of datasource names
  Throws: DKException
    if error occurs when retrieving datasource names
  Overrides:
    listDataSourceNames in class dkAbstractDatastore
public void addObject(dkDataObject dataobj) throws DKException, Exception
  Adds a DDO object.
  Parameters:
    ddo—a Federated object to be added.
  Throws: DKException
    if error occurs during add.
  Overrides:
    addObject in class dkAbstractDatastore
public void deleteObject(dkDataObject dataobj) throws DKException, Exception
  Deletes a data object.
  Parameters:
    ddo—a federated DDO object to be deleted
  Throws: DKException
    if error occurs during delete.
  Overrides:
    deleteObject in class dkAbstractDatastore
public void retrieveObject(dkDataObject dataobj) throws DKException, Exception
  Retrieves a data-object.
  Parameters:
    ddo—document object to be retrieved.
  Throws: DKException
    when retrieve failed.
  Overrides:
    retrieveObject in class dkAbstractDatastore
public void updateObject(dkDataObject dataobj) throws DKException, Exception
  Updates a data-object.
  Parameters:
    ddo—the data-object to be updated.
  Throws: DKException
    if error occurs in the datastore
  Overrides:
    updateObject in class dkAbstractDatastore
public void commit() throws DKException
  Commits all activities since the last commit.
  Throws: DKException
    is thrown since federated datastore does not support transaction scope for now.
  Overrides:
    commit in class dkAbstractDatastore
public void rollback() throws DKException
  Rolls back all activities since the last commit.
  Throws: DKException
    is thrown since Federated does not support transaction scope for now.
  Overrides:
    rollback in class dkAbstractDatastore
public boolean isconnected()
  Checks to see if the datastore is connected
  Returns:
    true if connected, false otherwise
  Overrides:
    isConnected in class dkAbstractDatastore
public DKHandle connection() throws Exception
  Gets the connection handle for the datastore.
  Returns:
    the connection handle
  Overrides:
    connection in class dkAbstractDatastore
public DKHandle handle(String type) throws Exception
  Gets a datastore handle.
  Parameters:
    type—type of datastore handle wanted
  Returns:
    a datastore handle
  Overrides:
    handle in class dkAbstractDatastore
public String userName()
  Gets the user name that user used to logon to the datastore.
  Returns:
    the userid that user used to logon
  Overrides:
    userName in class dkAbstractDatastore
public String datastoreName() throws Exception
  Gets the name of this datastore object. Usually it represents a datastore source's server name.
  Returns:
    datastore name
  Overrides:
    datastoreName in class dkAbstractDatastore
public String datastoreType() throws Exception
  Gets the datastore type for this datastore object.
  Returns:
    datastore type
  Overrides:
    datastoreType in class dkAbstractDatastore
public dkDatastoreDef datastoreDef() throws DKException, Exception
  Gets datastore definition.
  Returns:
    the meta-data (dkDatastoreDef) of this datastore
  Overrides:
    datastoreDef in class dkAbstractDatastore
public dkCollection listEntities() throws DKException, Exception
  Gets a list of federated entities from Federated server.
  Returns:
    a collection of dkEntityDef
  Throws: DKException
    if error occurs
  Overrides:
    listEntities in class dkAbstractDatastore
public String[] listEntityNames() throws DKException, Exception
  Gets a list of federated entities names from Federated server.
  Returns:
    an array of names
  Throws: DKException
    if error occurs
  Overrides:
    listEntityNames in class dkAbstractDatastore public String[] listTextEntityNames() throws DKException, Exception
   Gets a list of federated text search entities names from Federated server.
   Returns:
      an array of names
   Throws: DKException
      if error occurs
public String[] listParmEntityNames() throws DKException, Exception
   Gets a list of federated parametric search entities names from Federated server.
   Returns:
      an array of names
   Throws: DKException
      if error occurs
   Overrides:
      listEntityAttrs
public dkCollection listEntityAttrs(String entityName) throws DKException, Exception
   Gets a list of attributes for a given entity name.
   Parameters:
      entityName—name of entity to retrieve attributes for
   Returns:
      a dkCollection of dkAttrDef objects
   Throws: DKException
      if the entity name does not exist
   Overrides:
      listEntityAttrs in class dkAbstractDatastore
public String[] listEntityAttrNames(String entityName) throws DKException, Exception
   Gets a list of attribute names for a given entity name.
   Parameters:
      entityName—name of entity to retrieve attribute names for
   Returns:
      an array of attribute names
   Throws: DKException
      if the entity name does not exist
   Overrides:
      listEntityAttrNames in class dkAbstractDatastore
public String registerMapping(DKNVPair sourceMap) throws DKException, Exception
   Registers a mapping definition to this datastore. Mapping is done by entities.
   Parameters:
      sourceMap—source name and mapping, a DKNVPair class with the following possible values:
         ("BUFFER",): buffer_ref is a reference to a string in memory
         ("FILE", ): file_name is the name of the file containing the mapping
         ("URL",): URL-address location of the mapping
         ("LDAP",): LDAP file-name
         ("SCHEMA",): a reference to a dkSchemaMapping object
      defining the
         mapping. Currently, only "SCHEMA" option is supported, others
   may be
      added later.
   Returns:
      the name of the mapping definition.
   Overrides:
      registerMapping in class dkAbstractDatastore
   See Also:
      unRegisterMapping
public void unRegisterMapping(String mappingName) throws DKException, Exception
   Unregisters mapping information from this datastore.
   Parameters:
      mappingName—name of the mapping information
   Overrides:
      unRegisterMapping in class dkAbstractDatastore
   See Also:
      registerMapping
public String[] listMappingNames() throws DKException, Exception
   Gets the list of the registered mappings for this datastore.
   Returns:
      an array of registered mapping objects' names. The array length would be
      zero if there is no mapping registered.
   Overrides:
      listMappingNames in class dkAbstractDatastore
   See Also:
      registerMapping
public dkSchemaMapping getMapping(String mappingName) throws DKException, Exception
   Gets mapping information from this datastore.
   Parameters:
      mappingName—name of the mapping information
   Returns:
      the schema mapping object
   Overrides:
      getMapping in class dkAbstractDatastore
   See Also:
      registerMapping
public synchronized dkExtension getExtension(String extensionName) throws DKException, Exception
   Gets the extension object from a given extension name.
   Parameters:
      extensionName—name of the extension object.
   Returns:
      extension object.
   Overrides:
      getExtension in class dkAbstractDatastore
public synchronized void addExtension(String extensionName, dkExtension extensionObj) throws DKException, Exception
   Adds a new extension object.
   Parameters:
      extensionName—name of new extension object
      extensionObj—the extension object to be set
   Overrides:
      addextension in class dkAbstractDatastore
public synchronized void removeExtension(String extensionName) throws DKException, Exception
   Removes an existing extension object.
   Parameters:
      extensionName—name of extension object to be removed
   Overrides:
      removeExtension in class dkAbstractDatastore public synchronized String[ ] listExtensionNames() throws DKException, Exception
   Gets the list of extension objects' names.
   Returns:
      an array of extension objects' names
   Overrides:
      listExtensionNames in class dkAbstractDatastore
public DKDDO createDDO(String objectType, int Flags) throws DKException, Exception
   Creates a new DDO with object type, properties and attributes set for a given backend server.
   Parameters:
      objectType—the object type
      Flags—to indicate various options and to specify more detailed characteristics of the DDO
         to create. For example, it may be a directive to create a document DDO, a
         folder, etc.
   Returns:
      a new DDO of the given object type with all the properties and
         attributes set, so that the user only needs to set the attribute values
   Overrides:
      createDDO in class dkAbstractDatastore
public dkCollection listSearchTemplates() throws DKException, Exception
   Gets a list search templates from a federated server.
   Returns:
      a DKSequentialCollection of search templates
   Throws: DKException
      if internal datastore error occurs
public String[ ] listSearchTemplateNames() throws DKException, Exception
   Gets a list search templates' names from a federated server.
   Returns:
      an array of search template names
   Throws: DKException
      if internal datastore error occurs
public dkSearchTemplate getSearchTemplate(String templateName) throws DKException, Exception
   Gets a search template information from a given template name.
   Returns:
      dkSearchTemplate object.
   Throws: DKException
      if internal datastore error occurs
public void destroy() throws DKException, Exception
   datastore destroy—datastore cleanup if needed
   Overrides:
      destroy in class dkAbstractDatastore
public synchronized string addRemoveCursor (dkResultSetCursor iCurt int action) throws DKException, Exception
public dkDatastore datastoreByServerName (String dsType, String dsName) throws DKException, Exception
   Gets a reference to the specified datastore. The datastore must be connected, otherwise it will return null even if one is found. First, it will look in the free connection pool. If none found, it will look under the connection pool held by active cursors.

public void changePassword (String serverName,
   String user Id,
   String oldPwd,
   String newpwd)
   throws DKException, Exception
   Changes the password of a given user Id for a specified server. Administrator only function.
   Parameters:
      userId—the user-id
      oldPwd—the old password
      newPwd—the new password
public void requestConnection (String serverName,
   String userId,
   String passwd,
   String connectString)
   throws DKException, Exception
   Requests a connection to a particular server with the given userid, password & connectString.
   Parameters:
      userId—the user Id
      passwd—the password
      connectString—the connect string to logon
public void excludeServer (Sting serverName, String templateName) throws DKException, Exception
   Requests the named server to be skipped for the named search template.
   Parameters:
      serverName—a back end server name
      templateName—a search template name
public boolean isServerExcluded (String serverName, String templateName) throws DKException, Exception, java.rmi.RemoteException
   Checks if the given server is in the excluded list for the named search template.
   Parameters:
      serverName—a back end server name
      templateName—a search template name
   Returns:
      true or false
public String[ ] listExcludedServers(String templateName) throws DKException, Exception
   Lists all the excluded servers for the named search template
   Parameters:
      s—templateName—a search template name
   Returns:
      an array of server names that were excluded during search
public void clearExcludedServers(String templateName) throws DKException, Exception
   Clears all the excluded servers for the named search template
   Parameters:
      s—templateName—a search template name
   The following is sample syntax of a federated query string. However, it is to be understood that other syntax, including other parameters, may be used for the federated query string without departing from the scope of the invention.
      PARAMETRIC_SEARCH=([ENTITY=entity_name,]
         [MAX_RESULTS=maximum_results,]
         [COND=(conditional_expression)]
         [; . . . ]
      );

```
[OPTION=([CONTENT=yes_no]
        )]
[and_or
TEXT_SEARCH=(COND=(text_search_expression)
             );
    [OPTION=([SEARCH_INDEX={search_index_name |
(index_list) };]
        [MAX_RESULTS=maximum_results;]
        [TIME_LIMT=time_limit]
        )]
]
[and_or
IMAGE_SEARCH=(COND=(image_search_
    expression)
             );
    [OPTION=([SEARCH_INDEX={search_index_name |
(index_list) };]
        [MAX_RESULTS=maximum_results;]
        [TIME_LIMIT=time_limit]
        )]
]
```

There are several mechanisms for users to submit federated queries for execution. For example, users can create a federated query string and pass it to a federated query object and then invoke an execute or evaluate method on that object to trigger the query processing. Alternatively, a user can pass the federated query string to the execute or evaluate method in the federated datastore to process the query directly. The query string will be parsed into a federated query canonical form (query expression), which is essentially a datastore neutral representation of the query. In case the input query comes from a graphical user interface (GUI) based application, the query does not need to be parsed and the corresponding canonical form can be directly constructed.

The query canonical form is the input for the federated query processor module. This module will perform the following tasks:

Query Translation

Translates the query canonical form into several native queries that corresponds to each native datastore associated to this federated datastore. The translation information is obtained from the schema mapping.

Data Conversion

Converts data in the query into a native data type for each of the associated native datastores. This process uses the mapping and conversion mechanisms described in the schema mapping.

Data Filtering

Filters only the relevant data during the construction of native queries.

Each native query is submitted to the corresponding native datastore for execution. Initially, the results returned are cursors to the data in each datastore.

The end-result of an initial query is a federated result set cursor object, which is a virtual collection (i.e., at this time, data has not actually been retrieved) of cursors to objects in each of the native datastores.

The user can retrieve the actual data using a fetch. When a fetch is issued for data, the data is returned by the native datastores to the federated query results processor module, which will do the following:

Data Conversion

Converts data from the native type into a federated type according to the mapping information.

Data Filtering

Filters the results to include only the requested data.

Result Merging

Merges the results from several native datastores into a federated collection.

The federated result set cursor object provides the facility to separate query results according to the source native datastores. To do such a processing, the user/application may either use the federated cursor to fetch data or a native datastore cursor to fetch data from a particular datastore.

A FederatedQuery represents and executes queries across heterogeneous datastores. This query can be a combination of a DL parametric query, OnDemand query, and other query types involving supported datastores. To retrieve data from each datastore, the federated datastore delegates the query processing task to each of the native datastores.

DKFederatedQuery.java

```
package com.ibm.mm.sdk.common.DKFederatedQuery
public class DKFederatedQuery
    extends Object
        implements dkQuery, DKConstant, DKMessageId,
            Serializable
{
public DKFederatedQuery(dkDatastore creator,
    String queryString)
public DKFederatedQuery(dkDatastore creator,
public DKFederatedQuery(DKFederatedQuery
    fromQuery)
public void prepare(DKNVPair params[]) throws
    DKException, Exception
public void execute(DKNVPair params[]) throws
    DKException, Exception
public int status()
public Object result() throws DKException, Exception
public dkResultSetCursor resultSetCursor() throws
    DKException, Exception
public short qlType()
public String queryString()
public dkDatastore getDatastore()
public void setDatastore(dkDatastore ds) throws
    DKException, Exception
public String getName()
public void setName(String name)
public int numberOfResults()
};
```

The following methods are part of the federated query class:

public DKFederatedQuery(dkDatastore creator, String queryString)

Constructs a Federated query.

Parameters:

creator—datastore queryString—a query string public DKFederatedQuery(dkDatastore creator, DKCQExpr queryExpr)

Constructs a Federated query

Parameters:

creator—datastore queryExpr—a query expression public DKFederatedQuery(DKFederatedQuery from Query)

Constructs a Federated query from a Federated query object.

Parameters:
    fromQuery—Federated query
public voidprepare(DKNVPair params[]) throws DKException, Exception
  Prepares a query.
  Parameters:
    params—additional prepare query option in name/value pair
public void execute(DKNVPair params[]) throws DKException, Exception
  Executes a query.
  Parameters:
    params—additional query option in name/value pair
public int status()
  Gets query status.
  Returns:
    query status
public Object result() throws DKException, Exception
  Gets query result.
  Returns:
    query result in a DKResults object
public dkResultSetCursor resultSetCursor() throws DKException, Exception
  Gets query result.
  Returns:
    query result in a dkResultSetCursor object
public short qlType()
  Gets query type.
  Returns:
    query type
public String queryString()
  Gets query string.
  Returns:
    query string
public dkdatastore getDatastore()
  Gets the reference to the owner datastore object.
  Returns:
    the dkDatastore object
public void setDatastore(dkDatastore ds) throws DKException, Exception
  Sets the reference to the owner datastore object.
  Parameters:
    ds—a datastore
public String getName()
  Gets query name.
  Returns:
    name of this query
public void setName(String name)
  Sets query name.
  Parameters:
    name—new name to be set to this query object
public int numberOfResults()
  Gets the number of query results.
  Returns:
    number of query results

Schema Mapping

A schema mapping represents a mapping between the schema in a datastore with the structure of the data-object that the user wants to process in memory. Schema mapping has been generally described in U.S. patent application Nos. 08/276,382 and 08/276,747, also assigned to IBM.

A federated schema is the conceptual schema of a federated datastore 100, which defines a mapping between the concepts in the federated datastore 100 to concepts expressed in each participating datastore schema. In general, a schema mapping handles the difference between how the data are stored in the datastore (as expressed by the datastore's conceptual schema) and how the user wants to process them in the application program. This mapping can also be extended to incorporate relationship associations among entities in a federated datastore, e.g., associating an employee's name with the appropriate department name. Since the mapping process can be a bit tedious, it is usually done with the help of a typical GUI-oriented schema mapping program.

In addition to schema-mapping information involving the mapping of entities and attributes, a federated datastore 100 must also have access to the following information:

User-id and Password Mapping

To support single sign-on features, each user-id in the federated datastore 100 needs to be mapped to its corresponding user-ids in the native datastores.

Datastore Registration

Each native datastore needs to be registered so it can be located and logged-on to by the federated datastore 100 processes on behalf of its users.

Extended Grand Portal Architecture

Figure 5:
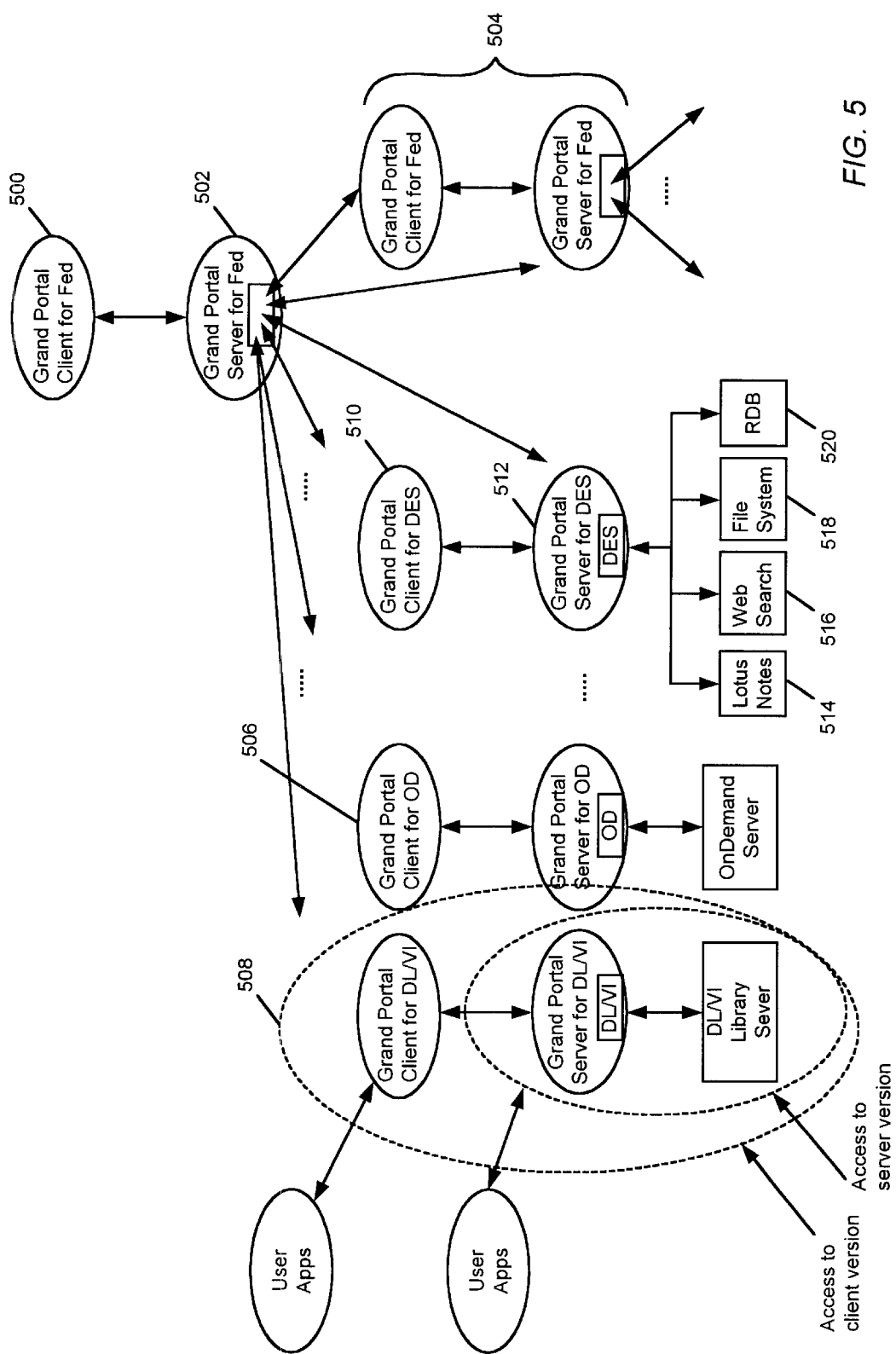
FIG. 5 is a diagram of an extended Grand Portal architecture.

In one embodiment, the invention is used within an extended Grand Portal Architecture. FIG. 5 is a diagram of an extended Grand Portal architecture. A Grand Portal client for a federated client datastore 500 is connected to a Grand Portal server for a federated server datastore 502. Another federated client/server system 504 may be connected to the federated server 502. A Grand Portal client/server system for an OnDemand (OD) datastore 506 may be part of the federation. Additionally, a Grand Portal client/server system for a Digital Library/VisualInfo (DL/VI) datastore 508 may be part of the federation. As with any of the datastores discussed herein, a user may access the client or the server directly. Therefore, user applications may reside at either the client or the server.

A Grand Portal client for a DES datastore 510 or a Grand Portal server for a DES datastore 512 may each be connected to the federation. While the DL/VI datastore enables searching a DL/VI Library server and the OD datastore enables searching of an OnDemand datastore, the DES datastore enables searching of multiple other datastores. In particular, the DES datastore enables searching of a Lotus Notes server 514, a Web 516, a file system 518, and a relational database 520.

Figure 6:
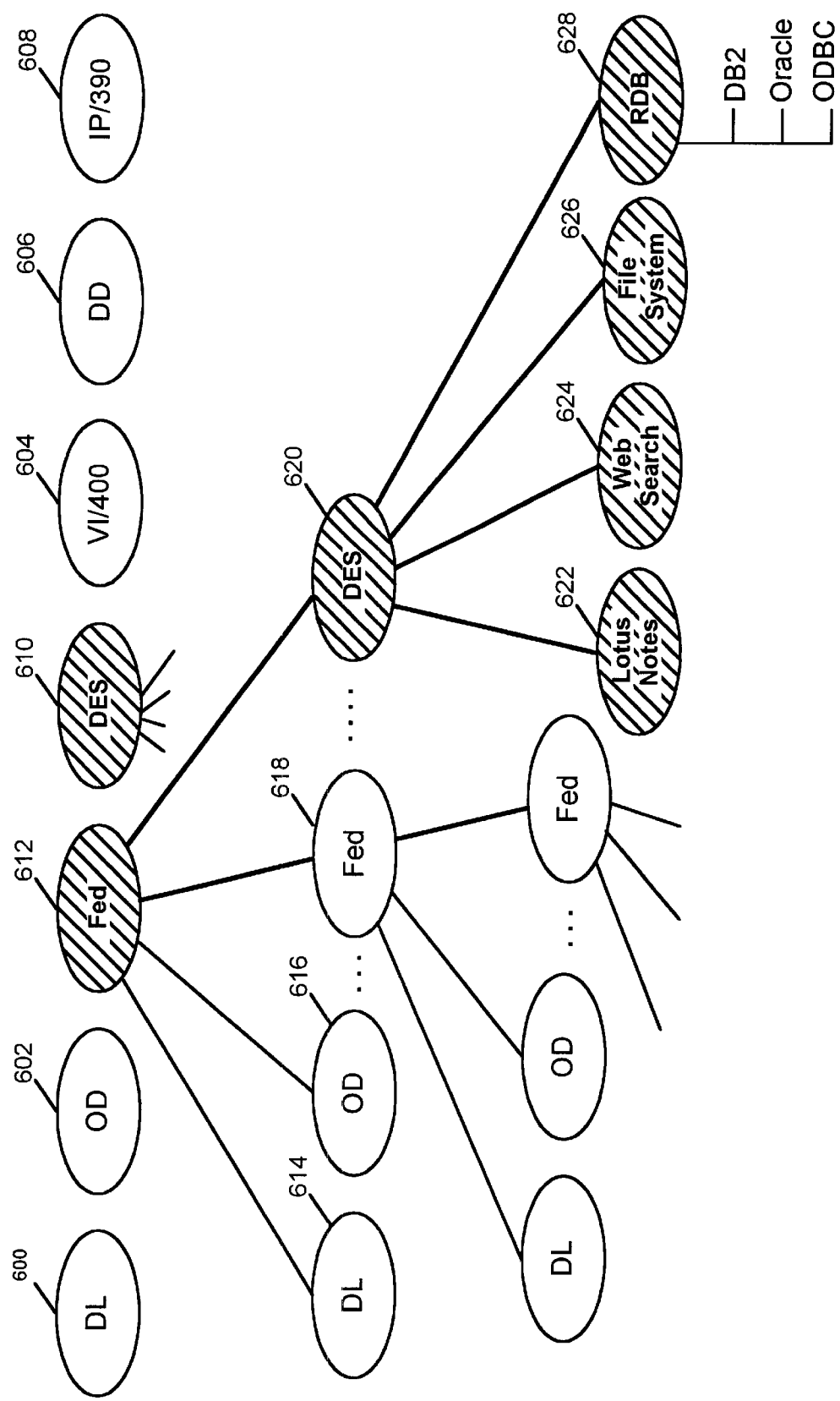
FIG. 6 is a diagram illustrating individual datastores and federated compositions.

FIG. 6 is a diagram illustrating individual datastores and federated compositions. In particular, a datastore can be configured as a stand-alone or as part of a federation. Additionally, a federated datastore can be composed of any number of datastores, including other federated datastores. Stand-alone datastores may be accessed directly by a user. The following are example stand-alone datastores in FIG. 6: a Digital Library (DL) datastore 600, an OnDemand datastore 602, a VisualInfo/400 datastore 604, a Domino.Doc datastore 606, or a ImagePlus/390 datastore 608. Additionally, a DES datastore 610 maybe a stand alone in that it is not part of a federated composition. A federated composition 612 may include individual datastores 614 and 616, another federated datastore 618, and a search gateway to a DES datastore 620. In turn, the DES datastore 620 enables searching a Lotus Notes database 622, searching the Web 624, searching a file system 626, or searching a relational database 628 (e.g., DB2, Oracle, or ODBC).

Delayed Delivery of Query Results or Other Data from a Federated Server To a Federated Client until Such Information Is Needed An embodiment of the invention provides a delayed delivery system that provides delayed delivery of query results or other data from a federated server to a federated client until such information is needed. The query results or other data could be either a collection of items (e.g., objects or cursors to objects) or a large result (e.g., a binary large object or BLOB). When data is being retrieved in a client/server system, transmitting multiple items or BLOBs from the server to the client could clog up a network. Therefore, the data delivery system enables transmission of only some of the multiple items or of the BLOB only when and if needed by an application program.

In particular, an application program may request data from a federated server via a federated client. The federated client requests the data from a federated server. The federated server searches for data in the native datastores and generates a server collection (i.e., an object that stores data) that provides indicators to the location of data found in the native datastores.

The result of the search is not immediately returned to the federated client. Instead, the federated client generates an empty client collection (i.e., empty as no data is in the collection) that has the same structure as the server collection. The client collection is a virtual collection as it does not contain physical data. The client collection is represented by a class with methods for accessing data. When data is needed, an application program uses the methods of the client collection to request particular data, and the federated client retrieves physical data from the federated server. In particular, the indicators in the server collection are used to retrieve physical data. This data is forwarded to the federated client for transmittal to the application program.

Delaying delivery of query results or other data from the federated server to the federated client until such information is needed increases performance and avoids transfer of unused data during communication between the federated client and federated server. In particular, the data delivery system provides a new technique for data transfer that improves performance and memory usage for application programs at the federated client, especially when the federated client needs to retrieve a large amount of data from the federated server.

The client collection represents the results of a query (which retrieved data from one or more datastores) at the federated client without considering any network communication between the federated client and federated server. Because the data delivery system provides a client collection, an object oriented application program may manipulate data objects as a group or collection of items at the federated client with the same semantics as at the federated server. In particular, the client collection has the same format as the server collection (i.e., they are based on the same class). Therefore, an application program can iterate over the data in the client collection or data in the server collection in the same manner (i.e., using iterator methods that are part of the class on which the collections are based).

In client/server systems, communication through a network for a remote application program (e.g., an application program residing at the client that attempts to obtain data from the server) may be difficult. However, if the remote application program uses the same Application Programming Interface (API) at the client as would be used by that application program if it resided at the server, the application program could be used at either site. Therefore, the data delivery system provides an object oriented application program the ability to manipulate data objects as a group or collection at the client with the same semantics as at the server.

The client collection provides the same semantic collection as the server collection, hiding the details of communication between the server and client. The semantics include the following actions: adding an item to the collection, deleting an item from the collection, updating an item in the collection, retrieving an item from the collection, sorting collection items, creating an iterator for the collection, etc.

The client iterator provides the same semantic iterator from the server iterator, hiding the details of communication between the server and client. The semantics include the following actions: moving an iterator to the next position, moving an iterator to the previous position, setting an iterator to a specific position, etc.

The number of data transfers between the server and client can aggravate performance and memory usage when the client collection has a large amount of data. The data delivery system provides delayed retrieval of data from the server to the client to improve performance and memory usage and to avoid transfer of unused data.

The data delivery system is able to delay the retrieval of a binary large object (BLOB). Additionally, if a collection is comprised of multiple dynamic data objects, the data delivery system enables retrieving only the dynamic data objects that are needed. Furthermore, if a collection is comprised of a set of cursors identifying the locations of dynamic data objects, the data delivery system enables retrieving only particular dynamic data objects identified by particular cursors.

Figure 7:
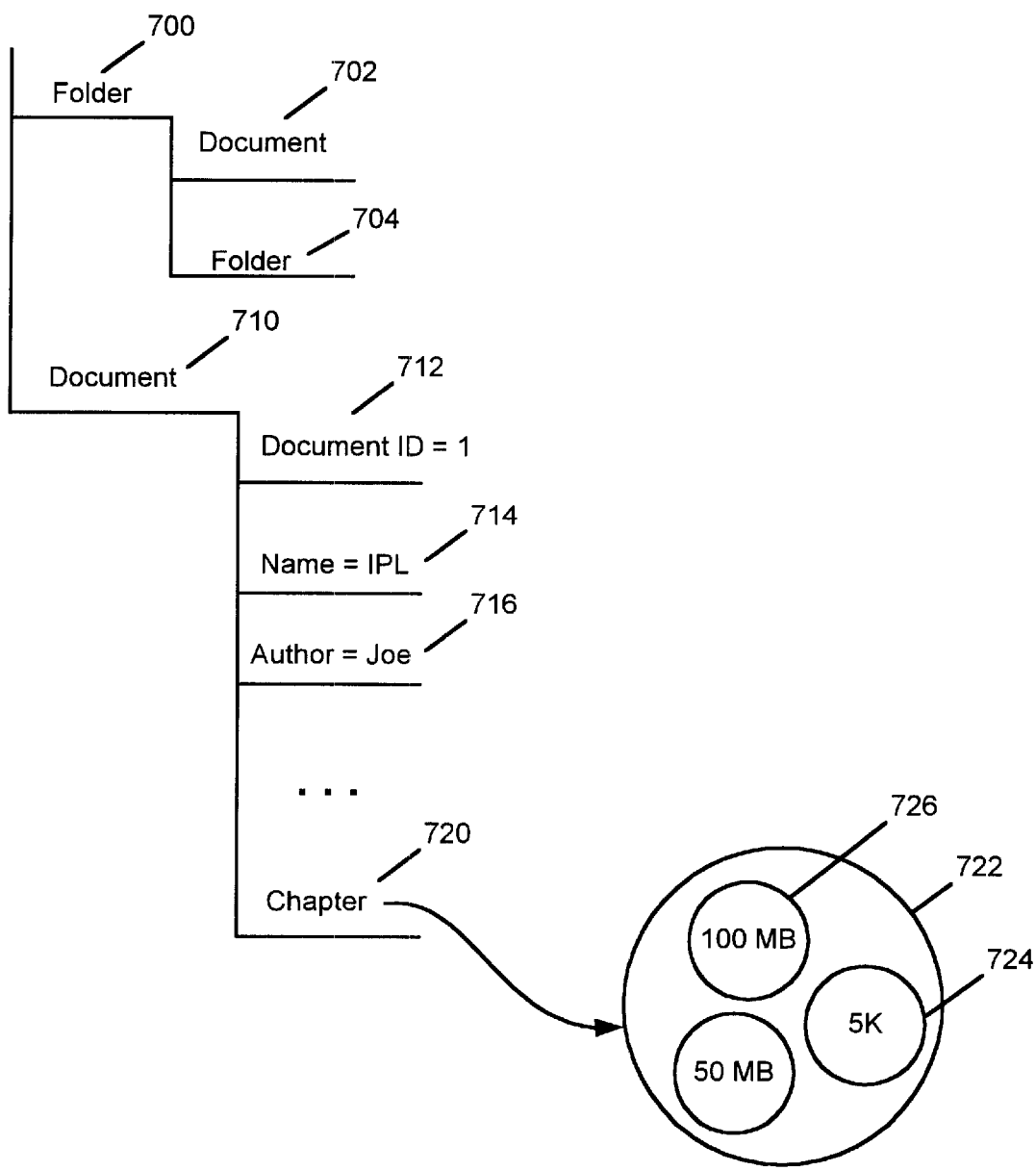
FIG. 7 is a diagram illustrating an example structure of dynamic data objects.

FIG. 7 is a diagram illustrating an example structure of dynamic data objects. A collection may be comprised of one or more dynamic data objects. A folder 700 or document 710 may be dynamic data objects. A folder 700 may contain a document 702 or another folder 704. A document 710 has parametric data that may be queried. For example, a document may have a document identifier 712, a document name 714, an author name 716, a chapter reference 720, and other information, as indicated by the ellipses. The chapter reference may be a reference to data 722 comprised of text of 7 K bytes 724 and an image of 100 megabytes 726. The data delivery system may be used to delay the retrieval of a BLOB such as 726.

Figure 8:
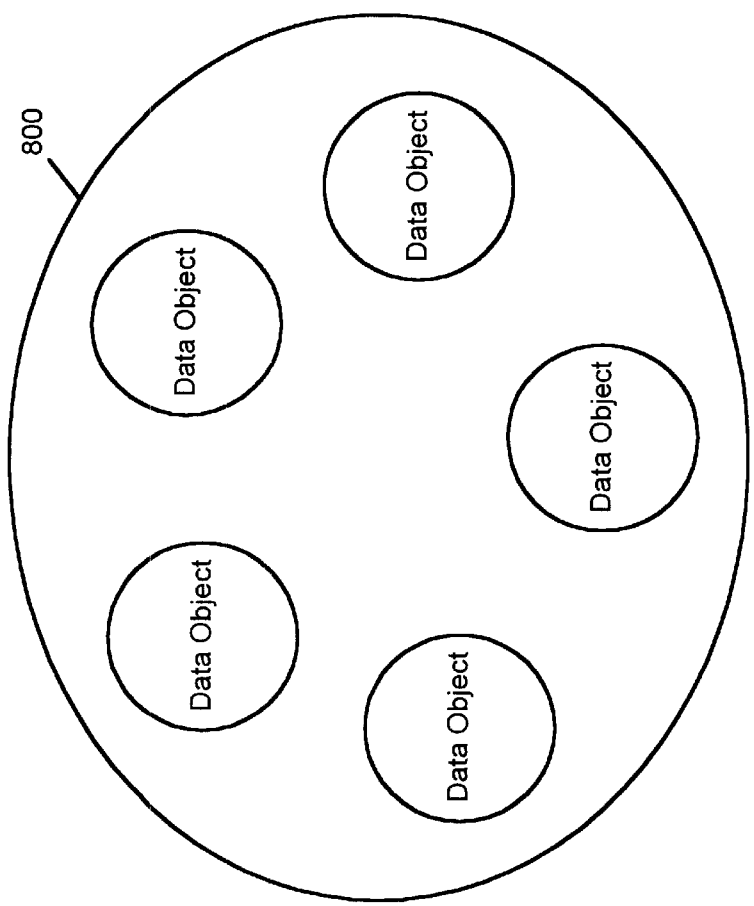
FIG. 8 is a diagram illustrating a federated collection of dynamic data objects.

FIG. 8 is a diagram illustrating a federated collection 800 of dynamic data objects. In one embodiment of the invention, the client and server collections are federated collections 800. A federated collection allows an application program to process data objects resulting from a query as a group or collection and at the same time preserves the sub-grouping relationships that exist between them. It provides the user or application program with a mechanism to aggregate several collections of data objects while preserving each individual collection's information and to treat these collections as one whole unit of collection, ignoring collection boundaries.

Figure 9:
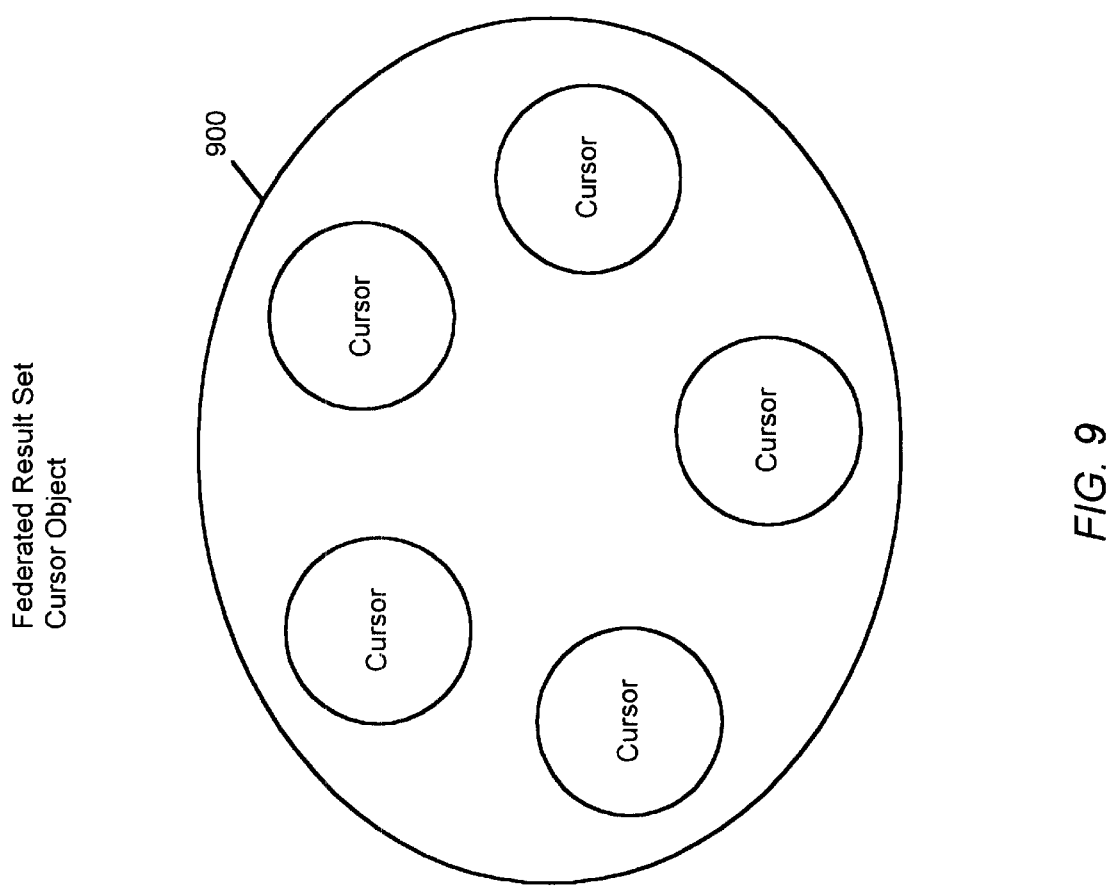
FIG. 9 is a diagram illustrating a federated result set cursor object.

A federated collection is a collection containing results objects (i.e., objects from each native datastore). The federated collection is created to hold the results of a federated query, which may come from several heterogeneous datastores. Each results object contains the results of a subquery of the federated query submitted to a specific native datastore associated with the federated datastore. I FIG. 9 is a diagram illustrating a federated result set cursor object 900. In an embodiment of the invention, the client and server collections are federated result set cursor objects. In particular, when a search is performed in a federated datastore, each "heterogeneous" or "native" datastore is searched. Then, a federated result set cursor object is returned, which points to the data. A cursor is a an indicator that indicates the beginning of a set of data (e.g., records, files, etc.). A federated result set cursor object comprises a federated cursor that may be used to fetch data sequentially from each datastore and a native cursor for each native datastore that may be used to fetch data from a particular native datastore. For example, if the federated cursor initially points to data in a first datastore, serial fetches may be used to retrieve each piece of data in the first datastore, then the cursor is moved to another datastore, and fetches are used to retrieve data in this datastore. If a native datastore cursor is used to fetch data, the data is retrieved from the specified native datastore starting at the cursor position.

When searching is performed in a federated datastore, the federated engine searches each heterogeneous datastore connected to the federated datastore. The federated engine may retrieve data from each separate datastore. Thus, the federated engine needs a technique for providing the data retrieved from multiple datastores in a single result set.

Figure 10:
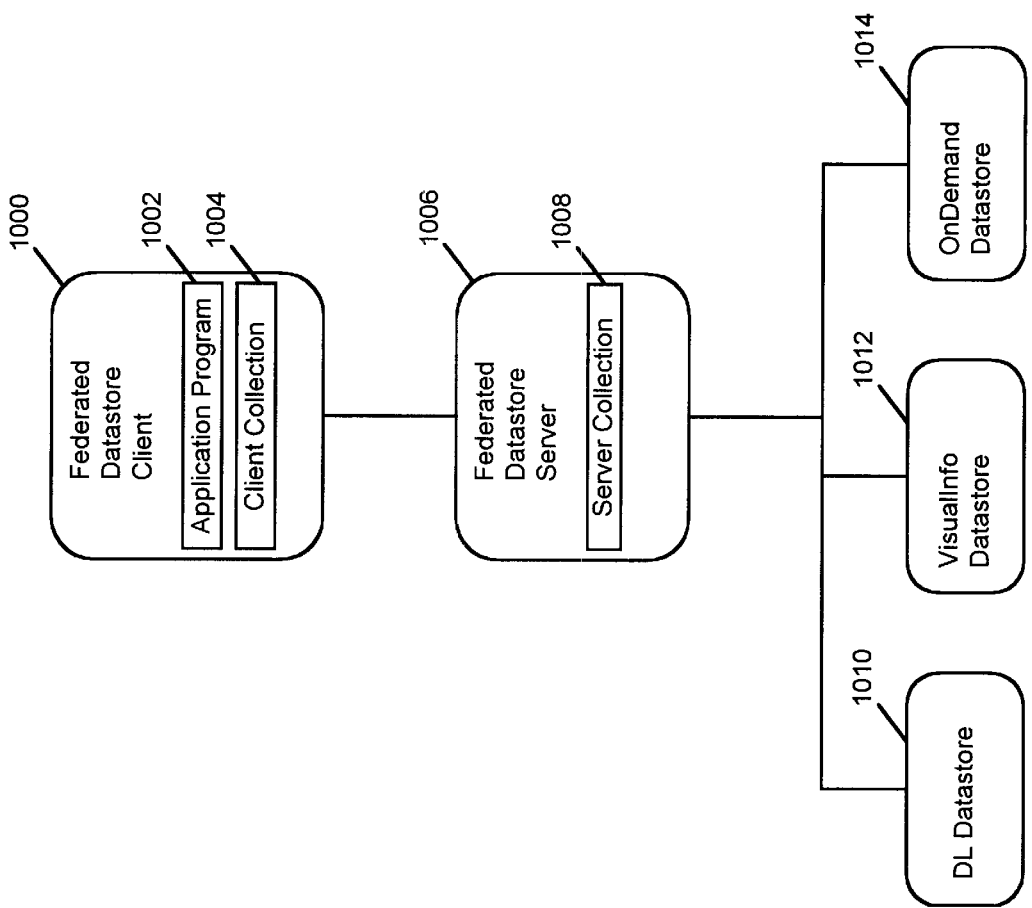
FIG. 10 is a diagram illustrating one use of the data delivery system.

FIG. 10 is a diagram illustrating one use of the data delivery system. In this example, a collection is a federated result set cursor object. A federated datastore client 1000 is connected to a federated datastore server 1006. An application program 1002 resides at the federated datastore client 1000. As will be discussed below, the client collection 1004 is generated at the federated datastore client 1000.

The federated datatstore server 1006 is connected to several native datastores. The native datastores in this example include a DL (Digital Library) datastore 1010, a VisualInfo datastore 1012, and an OnDemand datastore 1014.

Initially, if the application program 1002 would like to retrieve data from the native datastores, the application program 1002 submits a query to the federated datastore client 1000. Although not shown, an application program may also submit a query directly at the federated datastore server 1006. The federated datastore client 1000 transmits a search request to the federated datastore server 1006 specifying the data to be retrieved. The federated datastore server 1006 retrieves cursors indicating the location of data and stores the cursors in the server collection 1008.

Note that the federated datastore server 1006 is able to determine the type of data to be retrieved (i.e., image or text) and recognizes which type of query each native datastore 1010, 1012, and 1014 is able to process. Therefore, the federated datastore server 1006 determines which native datastores are to receive the query. In this example, the federated datastore server 1006 requests each native datastore 1010, 1012, and 1014 to process the query.

Each native datastore 1010, 1012, and 1014 performs a search for the requested data and sets a cursor to the data found in that native datastore 1010, 1012, and 1014. Additionally, the federated datastore server 1006 sets a cursor to the same location as a cursor in one of the native datastores, for example, native datastore 1012.

After requesting data from the federated datastore server 1006, the federated datastore client 1000 generates an empty client collection 1004. The client collection 1004 has the same structure as the server collection 1008, and the application program 1002 can iterate through items in either collection using the same methods (i.e., iterators). Then, when the application program 1002 needs data, the application program requests the data from the client collection 1004. At this time, the federated datastore client 1000 retrieves physical data using the cursors and methods of the server collection 1008. The federated datastore client forwards the physical data to the application program.

In one embodiment of the invention, a client or server collection is implemented as a federated result set cursor object, and one or more methods are provided to manipulate the federated result set cursor object. In one embodiment, the class definitions and methods reside at the federated datastore client and server.

In an object-oriented application, a result set cursor class is defined as a virtual collection in which the elements of the collection can be fetched one by one using fetch methods. One embodiment of the invention provides a data structure and methods to group data objects resulting from a query in a special result set cursor object.

This structure is provided via a federated result set cursor object. The result set cursor object contains methods that allow a user or application program to fetch elements from the virtual collection. Since there is no conceptual mapping between datastores, the federated query result only reflects the union of results from each datastore.

An example class definition for DKResultSetCursor Fed.java is set forth below.

```
package com.ibm.mm.sdk.server;
import com.ibm.mm.sdk.common.*;
import com.ibm.mm.sdk.internal.*;
import java.io.*;
import java.lang*;
import java.util.Vector;
import java.sql.*;
public class DKResultSetCursorFed extends dkAbstractResultSetCursor
    implements DKConstantFed, DKMessageIdFed
{
    public class DKResultSetCursorFed(DKDatastoreFed ds,
        DKNVPair parms{})
        throws DKException, Exception
{
public boolean isScrollable() throws DKException,
    Exception;
public boolean isUpdatable() throws DKException,
    Exception;
public boolean isValid() throws DKException, Exception;
public boolean is()Open() throws DKException, Exception;
public boolean isBegin() throws DKException, Exception;
public boolean isEnd() throws DKException, Exception;
public boolean isBetween() throws DKException, Exception;
public int getPosition() throws DKException, Exception;
public void setPosition(int position, Object value) throws
    DKException, Exception;
public void setToNext() throws DKException, Exception;
public DKDDOfetchObject() throws DKException,
    Exception;
public DKDDOfetchNext() throws DKException, Exception;
``` public booleanfetchNext(int how_many, dkCollection collection) throws DKException, Exception;

public ObjectfetchObjectByName(String dataItemName) throws DKException, Exception;

public Object fetchNextByName(String dataItemName) throws DKException, Exception;

public booleanfetchNextByName(String dataItemName, int how_many, Object [] array) throws DKException, Exception;

public DKDDO findObject(int position, String predicate) throws DKException, Exception;

public void deleteObject() throws DKException, Exception;

public void updateObject(DKDDO ddo) throws DKException, Exception;

public DKDDO newObjecto throws DKException, Exception;

public void addObject(DKDDO ddo) throws DKException, Exception;

public void open() throws DKException, Exception;

public void open(DKNVPair parms[]) throws DKException, Exception;

public void close() throws DKException, Exception;

public void destroy() throws DKException, Exception;

public String datastoreName() throws Exception;

public String datastoreType() throws Exception;

public DKHandle handle(int type) throws Exception;

public DKHandle handle(String type) throws Exception;

public int cardinality() throws Exception;

synchronizedpublic dkResultSetCursorfetchNextRSCursor() throws DKException, Exception;

synchronized public void addRSCurso (dkResultSetCursor rsCursor);
}

The following methods are part of the federated result set cursor class:

public boolean isScrollable() throws DKException, Exception;

Scrollable indicator that returns true if cursor can be scrolled forward and backward.

public boolean isUpdatable() throws DKException, Exception;

Updatable indicator that returns true if cursor is updatable.

public boolean isValid() throwsDKException,Exception;

Valid indicator that returns true if cursor is valid.

public boolean isOpen() throws DKException, Exception;

Open indicator that returns true if cursor is in an opened state.

public boolean isBegin() throws DKException, Exception;

Begin indicator that returns true if cursor is positioned at the beginning.

public boolean isEnd() throws DKException, Exception;

End indicator that returns true if cursor is positioned at the end.

public boolean isBetween() throws DKException, Exception;

Between data objects in cursor indicator that returns true if cursor is in between data objects in the cursor.

public int getPosition() throws DKException, Exception;

Gets the current cursor position and returns the current cursor position.

public void setPosition(int position, Object value) throws DKException, Exception;

Sets the cursor to the given position, with the parameter "position" providing a cursor position option and the parameter "value" providing a cursor position value.

public void setToNext() throws DKException, Exception;

Sets cursor to point to the position of the next data object in the cursor.

public DKDDOfetchObject() throws DKException, Exception;

Fetches the element in the cursor at the current position and returns a DDO.

public DKDDOfetchNext() throws DKException, Exception;

Sets cursor to point to the position of the next data object and fetches the element in the cursor at that position and returns a DDO.

public boolean fetchNext(int how_many, dkCollection collection) throws DKException, Exception;

Fetches the next N elements of the cursor and inserts them into the given collection, with the parameter "how_many" indicating how many elements the user or application program wants to be returned in the collection and the parameter "collection" indicating the collection where elements that are fetched are stored. Returns true if there is at least one data object returned.

public Object fetchObjectByName(String dataItemName) throws DKException, Exception;

Fetches the data item value in the cursor at the current position by data item name, with the parameter "dataItemName" indicating a data item name, and returns an Object.

public Object fetchNextByName(String dataItemName) throws DKException, Exception;

Sets cursor to point to the position of the next data object and fetches the data item value in the cursor at that position by data item name, with the parameter "dataItemName" indicating a data item name, and returns an Object.

public boolean fetchNextByName(String dataItemName, int how_many, Object [] array) throws DKException, Exception;

Fetches the next N data item values of the cursor and inserts them into the given array, with the parameter "dataItemName" indicating a data item name, the parameter "how_many" indicating how many data item values the user or application program wants to be returned in the collection, and with the parameter "array" indicating an array where the data item values that are fetched are stored. Returns true if there is at least one data item value returned.

public DKDDO findObject(int position, String predicate) throws DKException, Exception;

Finds the data object which satisfies the given predicate, moves the cursor to that position, fetches the data object, and returns a DDO.

public void deleteObject() throws DKException, Exception;

Deletes element at the current cursor position from the datastore.

public void updateObject(DKDDO ddo) throws DKException, Exception;

Updates element at the current cursor position from the datastore.

public DKDDO newObjecto throws DKException, Exception;
  Constructs a new DDO of the same type as the items in the result and returns a DDO.
public void addObject(DKDDO ddo) throws DKException, Exception;
  Adds an element to the datastore.
public void open() throws DKException, Exception;
  Opens the cursor. This re-executes the query and repositions the cursor to the beginning.
public void open(DKNVPair parms[]) throws DKException, Exception;
  Opens the cursor. This re-executes the query and repositions the cursor to the beginning. The parameter "parms" allows for parameters to be passed in for the reexecution of the query.
public void close() throws DKException, Exception
  Closes the cursor and invalidates the result set.
public void destroy() throws DKException, Exception;
  Destroys the cursor. This method allows for cleanup, before garbage-collection is done on this class.
public String datastoreName() throws Exception;
  Gets the datastore name and returns the datastore name.
public String datastoreType() throws Exception;
  Gets the datastore type and returns the datastore type.
public DKHandle handle(int type) throws Exception;
  Gets a cursor handle with the parameter "type" indicating a type of cursor handle desired and returns a cursor handle. Deprecated Replace by handle(String type). See #handle (java.lang.String).
public DKHandle handle(String type) throws Exception;
  Gets a cursor handle with the parameter "type" indicating a type of cursor handle desired and returns a cursor handle.
public int cardinality() throws Exception;
  Gets the number of query results and returns the number of query results.
synchronized public dkResultSetCursorfetchNextRSCursor() throws DKException, Exception;
  Fetches the next result set cursor.
synchronized public void addRSCursor(dkResultSetCursor rsCursor);
  Adds a resultSet cursor to this federated cursor.
  The federated result set cursor is a nested result set cursor, which can have any amount of depth, with each result set cursor containing data objects resulting from a query against a specific datastore. The nested or federated result set cursor aggregates the query results from a set of heterogeneous datastores. The nested or federated result set cursor may be used with a federated datastore and a federated query object to store the results of a query against heterogeneous datastores.

The data delivery system delays delivery for data members and delays delivery for data content. For example, a book may contain sections, which are considered data members. Each data member may contain some information defined as data content (e.g., a section may have text and an image, with the image being defined as data content). An application program can request either a data member (e.g., a section and its text) or data content (e.g., the image). If the data content is not needed, the data delivery system avoids transferring unnecessary data.

When the client iterator navigates through data members, each data member is delivered one by one as needed. Then, the data content of the member is transferred as it is requested. The data transfer via a network is always an expensive action, especially when the amount of data being transferred is large and the number of data members is large. The data delivery system provides efficient data transfer by dispersing the data transfer and eliminating unnecessary transfer. The client application program is not aware of the actual residence of data at the client. The actual data is at the client only when it is needed and is transferred from the server.

Figure 11:
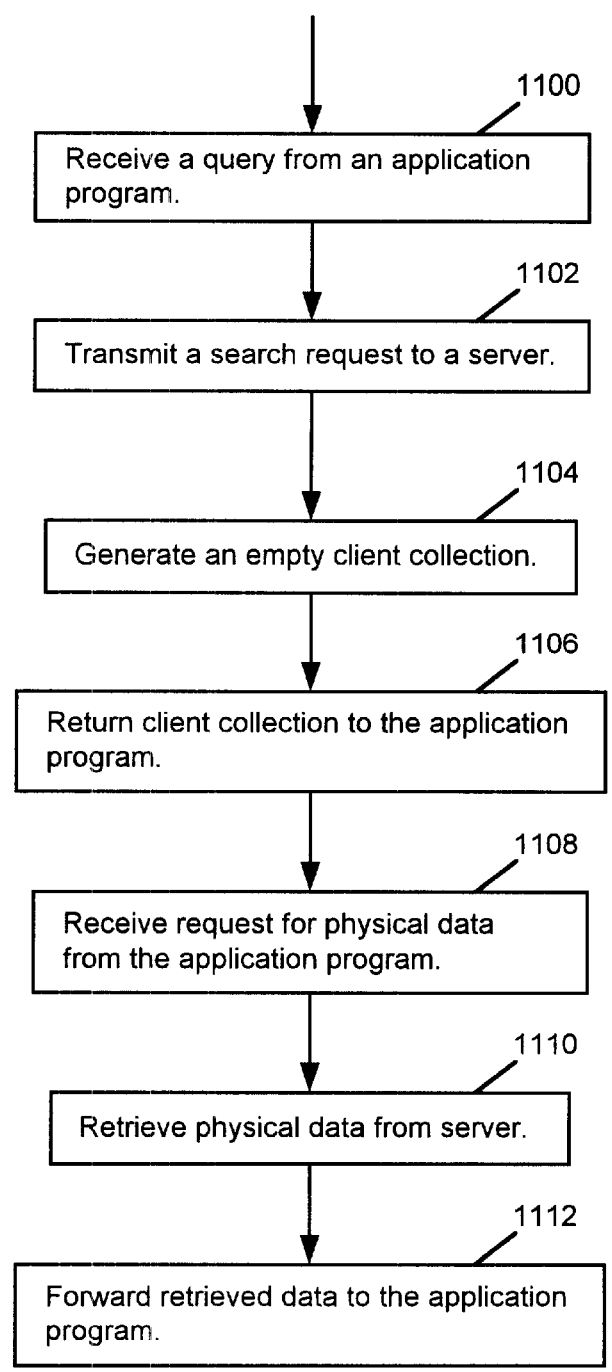
FIG. 11 is a flow diagram illustrating the steps performed by the data delivery system to provide delayed delivery of data.

FIG. 11 is a flow diagram illustrating the steps performed by the data delivery system to provide delayed delivery of data. In block 1100, the data delivery system receives a query from an application program. In block 1102, the data delivery system at a client transmits a search request to a server. At this time, the server retrieves data or cursors to data and stores these in a server collection, without transmitting any physical data to the client. In block 1104, the data delivery system generates an empty client collection. In block 1106, the data delivery system returns the client collection to the application program. In block 1108, the data delivery system receives a request for physical data for an item in the client collection from the application program. In particular, using a method in the client collection, the application program requests physical data for one or more items in the collection. In block 1110, the data delivery system retrieves physical data from the server. In block 1112, the data delivery system forwards the retrieved physical data to the application program.

Conclusion

This concludes the description of the preferred embodiment of the invention. The following describes some alternative embodiments for accomplishing the present invention. For example, any type of computer, such as a mainframe, minicomputer, personal computer, mobile device, or embedded system, or computer configuration, such as a timesharing mainframe, local area network, or standalone personal computer, could be used with the techniques of the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of executing one or more commands at a client computer to retrieve data from one or more datastores connected to a server computer, the method comprising the steps of:

at the client computer,
  transmitting a search request to the server computer; and
  generating a client collection for use in retrieving physical data from the server computer; and
at the server computer, generating a server collection with the same structure as the client collection, for use in retrieving the physical data, from the one or more datastores, based on the search request; wherein:
  the generating of the client collection is performed without providing the client collection the physical data,
  the generating of the server collection is performed so as to include retrieving at least part of the physical data from the one or more datastores, the physical data being represented by an object oriented (OO) object, and the client collection is provided with a part of the physical data, from the server collection, only when the part of the physical data is requested using the client collection.

2. The method of claim 1, wherein the client collection comprises one or more objects and further comprising iterating through objects in the client collection.

3. The method of claim 1, wherein the client collection comprises one or more objects and further comprising retrieving physical data for selected objects.

4. The method of claim 1, further comprising retrieving member data.

5. The method of claim 1, further comprising retrieving content data.

6. The method of claim 1, wherein an application program resides at the client computer and requests data from the server computer.

7. An apparatus for retrieving data from one or more datastores, comprising:
   a client computer connected to a server computer;
   a server computer having one or more datastores coupled thereto; and
   one or more computer programs of the computers, for:
      at the client computer,
         transmitting a search request to the server computer; and
         generating a client collection for use in retrieving physical data from the server computer; and
      at the server computer, generating a server collection with the same structure as the client collection, for use in retrieving the physical data, from the one or more datastores, based on the search request; wherein:
         the generating of the client collection is performed without providing the client collection the physical data,
         the generating of the server collection is performed so as to include retrieving at least part of the physical data from the one or more datastores, the physical data being represented by an object oriented (OO) object, and
         the client collection is provided with a part of the physical data, from the server collection, only when the part of the physical data is requested using the client collection.

8. The apparatus of claim 7, wherein the client collection comprises one or more objects and further comprising iterating through objects in the client collection.

9. The apparatus of claim 7, wherein the client collection comprises one or more objects and further comprising retrieving physical data for selected objects.

10. The apparatus of claim 7, further comprising retrieving member data.

11. The apparatus of claim 7, further comprising retrieving content data.

12. The apparatus of claim 7, wherein an application program resides at the client computer and requests data from the server computer.

13. An article of manufacture comprising a program storage medium readable by a client computer and embodying one or more instructions executable by the client computer to perform method steps for retrieving data from one or more datastores connected to a server computer, the method comprising the steps of:
   at the client computer,
      transmitting a search request to the server computer; and
      generating a client collection for use in retrieving physical data from the server computer; and
   at the server computer, generating a server collection with the same structure as the client collection, for use in retrieving the physical data, from the one or more datastores, based on the search request; wherein:
      the generating of the client collection is performed without providing the client collection the physical data,
      the generating of the server collection is performed so as to include retrieving at least part of the physical data from the one or more datastores, the physical data being represented by an object oriented (OO) object, and
      the client collection is provided with a part of the physical data, from the server collection, only when the part of the physical data is requested using the client collection.

14. The article of manufacture of claim 13, wherein the client collection comprises one or more objects and further comprising iterating through objects in the client collection.

15. The article of manufacture of claim 13, wherein the client collection comprises one or more objects and further comprising retrieving physical data for selected objects.

16. The article of manufacture of claim 13, further comprising retrieving member data.

17. The article of manufacture of claim 13, further comprising retrieving content data.

18. The article of manufacture of claim 13, wherein an application program resides at the client computer and requests data from the server computer.

* * * * *